US012209915B2

(12) United States Patent
Zuiderveen et al.

(10) Patent No.: US 12,209,915 B2
(45) Date of Patent: Jan. 28, 2025

(54) TEMPERATURE SENSOR AND INDICATOR

(71) Applicant: IFD Technologies Inc., Vancouver (CA)

(72) Inventors: Thomas Jacob Zuiderveen, Metcalfe (CA); Jeremy Michael Van Horn, Vancouver (CA); Justin George Pezzin, Coquitlam (CA); Yen-You Lin, Richmond (CA); Audrey Joy Corrine Siebert-Timmer, Abbotsford (CA); Elizabeth Sarah Smith Price, Montreal (CA); John Paul Chisholm, Vancouver (CA)

(73) Assignee: IFD Technologies Inc., Vancouver (CA)

( * ) Notice: Subject to any disclaimer, the term of this patent is extended or adjusted under 35 U.S.C. 154(b) by 987 days.

(21) Appl. No.: 17/262,683

(22) PCT Filed: Jul. 22, 2019

(86) PCT No.: PCT/CA2019/051009
§ 371 (c)(1),
(2) Date: Jan. 22, 2021

(87) PCT Pub. No.: WO2020/019065
PCT Pub. Date: Jan. 30, 2020

(65) Prior Publication Data
US 2021/0164849 A1 Jun. 3, 2021

Related U.S. Application Data

(60) Provisional application No. 62/702,166, filed on Jul. 23, 2018.

(51) Int. Cl.
*G01K 11/06* (2006.01)
*G01K 1/08* (2021.01)
*G01K 1/16* (2006.01)

(52) U.S. Cl.
CPC .............. *G01K 11/06* (2013.01); *G01K 1/08* (2013.01); *G01K 1/16* (2013.01)

(58) Field of Classification Search
CPC . G01K 11/06; G01K 1/08; G01K 1/16; G01K 1/02; G01K 7/02; G01K 2217/00;
(Continued)

(56) References Cited

U.S. PATENT DOCUMENTS 1,907,666 A * 5/1933 Raney .................... H01H 37/60
337/318
3,242,733 A 3/1966 Johnson
(Continued)

FOREIGN PATENT DOCUMENTS

CN 101836093 A 9/2010
CN 203705112 U 7/2014
(Continued)

*Primary Examiner* — Kristina M Deherrera
*Assistant Examiner* — Tania Courson
(74) *Attorney, Agent, or Firm* — Viridant IP

(57) ABSTRACT

A temperature sensor has a heat-sensitive element contained within a chamber, the heat-sensitive element changing from a first configuration to a second configuration at a predetermined temperature, and a biased member biased towards the chamber. The biased member initially is prevented from entering the chamber when the heat-sensitive element is in the first configuration and enters the chamber when the heat-sensitive element is in the second configuration. In some aspects, the first configuration is solid and the second configuration is liquid and a selectively permeable element is provided to allow the heat-sensitive element to exit the chamber in the liquid configuration. An indicator can be provided that has a plurality of feet initially held in a retained configuration by the biased member until the biased member enters the chamber to release the feet for sliding motion of the indicator.

25 Claims, 13 Drawing Sheets

(58) Field of Classification Search
CPC ...... H01H 85/06; H01H 85/08; H01H 85/175;
H01H 85/303; H01H 85/36; G01D 7/00
See application file for complete search history.

(56) References Cited

U.S. PATENT DOCUMENTS

| | | | |
|---|---|---|---|
| 3,254,179 A | | 5/1966 | Howard |
| 3,452,706 A | | 7/1969 | Vogt |
| 3,476,979 A | | 11/1969 | Stumpe et al. |
| 3,958,528 A | | 5/1976 | Hill |
| 3,965,849 A | * | 6/1976 | Gee .................. G01K 11/06 374/E11.006 |
| 4,016,762 A | | 4/1977 | Payne |
| 4,189,942 A | | 2/1980 | Giezen et al. |
| 4,220,942 A | * | 9/1980 | Meister .................. H01H 85/40 337/275 |
| 4,232,552 A | | 11/1980 | Hof et al. |
| 4,509,449 A | | 4/1985 | Chalmers |
| 4,601,588 A | | 7/1986 | Takahara et al. |
| 4,630,023 A | * | 12/1986 | Gawron .................. H01H 37/765 337/407 |
| 4,649,854 A | | 3/1987 | Janke et al. |
| 4,729,671 A | | 3/1988 | Asano et al. |
| 4,992,770 A | * | 2/1991 | Spalding .............. H01H 85/055 337/164 |
| 5,033,865 A | * | 7/1991 | Kuze .................... G05D 23/021 60/527 |
| 5,046,447 A | * | 9/1991 | Steinke .................. G01K 11/06 374/E11.006 |
| 5,078,078 A | * | 1/1992 | Cuk ........................ G01L 19/12 116/272 |
| 5,368,905 A | | 11/1994 | Ohno |
| 5,623,891 A | * | 4/1997 | Miller ...................... G01L 19/12 116/271 |
| 6,042,264 A | | 3/2000 | Prusik et al. |
| 6,203,114 B1 | | 3/2001 | Ehrlich |
| 6,256,183 B1 | * | 7/2001 | Mosesian ............. H01H 85/303 361/103 |
| 6,305,313 B1 | * | 10/2001 | Cunkelman ............ G01K 11/06 374/E11.006 |
| 6,311,654 B1 | | 11/2001 | Ushida et al. |
| 6,321,654 B1 | | 11/2001 | Robinson |
| 6,422,171 B1 | | 7/2002 | Betts |
| 6,429,662 B1 | * | 8/2002 | Cuk ........................ G01L 19/12 324/547 |
| 6,561,121 B1 | | 5/2003 | Rose |
| 6,812,713 B2 | * | 11/2004 | Cuk ........................ G01L 19/12 324/547 |
| 7,455,668 B2 | | 11/2008 | Petrakis |
| 7,476,224 B2 | | 1/2009 | Petrakis |
| 7,553,073 B2 | | 6/2009 | Liu et al. |
| 7,684,166 B2 | | 3/2010 | Donati et al. |
| 7,724,122 B2 | * | 5/2010 | Leach .................. H01H 85/303 337/123 |
| 7,785,299 B2 | * | 8/2010 | Crawford ............ A61M 39/045 116/306 |
| 8,172,458 B2 | | 5/2012 | Petrakis |
| 9,127,990 B2 | | 9/2015 | Rabinowitz et al. |
| 9,188,500 B2 | * | 11/2015 | Pezzin .................... G01L 23/00 |
| 9,217,990 B2 | | 12/2015 | Itabashi |
| 9,581,501 B2 | | 2/2017 | Kozono et al. |
| 10,605,849 B2 | * | 3/2020 | Pezzin .................... G01L 23/04 |
| 2002/0014673 A1 | * | 2/2002 | Leedy ................ H01L 25/0652 257/419 |
| 2002/0135454 A1 | * | 9/2002 | Ichida ...................... G01K 7/18 374/E7.021 |
| 2004/0099203 A1 | | 5/2004 | Parker |
| 2005/0211153 A1 | | 10/2005 | Ribi et al. |
| 2008/0117015 A1 | | 5/2008 | Leach |
| 2009/0159311 A1 | | 6/2009 | Zheng et al. |
| 2012/0234227 A1 | | 9/2012 | Nichols |
| 2013/0074603 A1 | * | 3/2013 | Pezzin .................... G01L 23/00 73/716 |
| 2014/0211829 A1 | | 7/2014 | Nichols |
| 2014/0318438 A1 | | 10/2014 | Furue et al. |
| 2015/0369672 A1 | | 12/2015 | Ding et al. |
| 2015/0369673 A1 | | 12/2015 | Ding et al. |
| 2016/0138979 A1 | | 5/2016 | Ding et al. |
| 2017/0030780 A1 | | 2/2017 | Volk |
| 2020/0211804 A1 | * | 7/2020 | Wang ...................... H02H 3/05 |

FOREIGN PATENT DOCUMENTS

| | | |
|---|---|---|
| CN | 103998907 A | 8/2014 |
| CN | 106052899 A | 10/2016 |
| CN | 108603795 A | 9/2018 |
| DE | 202018102482 U1 | 6/2018 |
| EP | 0497638 B1 | 9/1996 |
| FR | 2626668 A1 | 8/1989 |
| GB | 2155678 A | 9/1985 |
| GB | 2209396 A | 5/1989 |
| GB | 2242522 A | 2/1992 |
| JP | S54124896 U | 8/1979 |
| JP | S5694936 U | 7/1981 |
| JP | H06347340 A | 12/1994 |
| JP | 2002139386 A | 5/2002 |
| WO | 2005054800 A1 | 6/2005 |

* cited by examiner

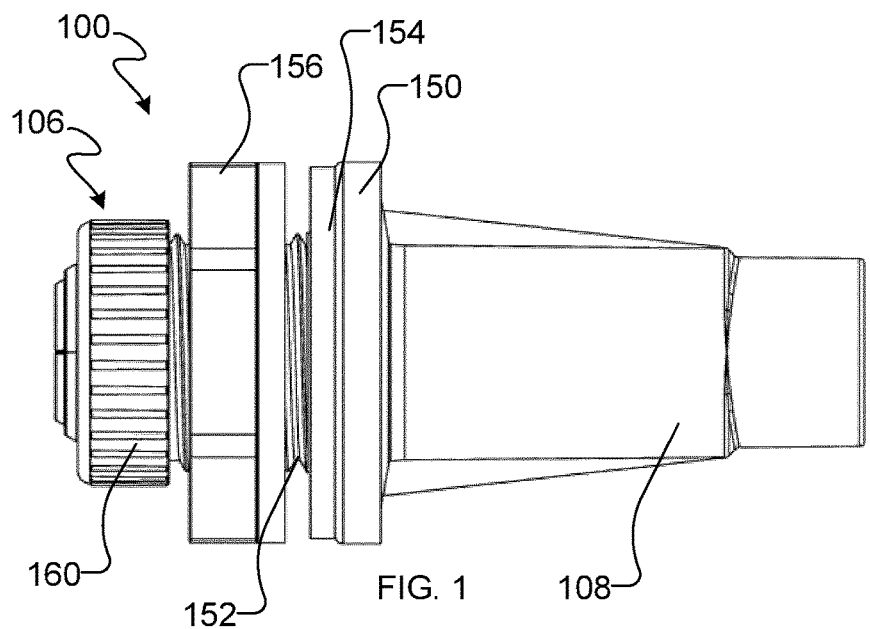
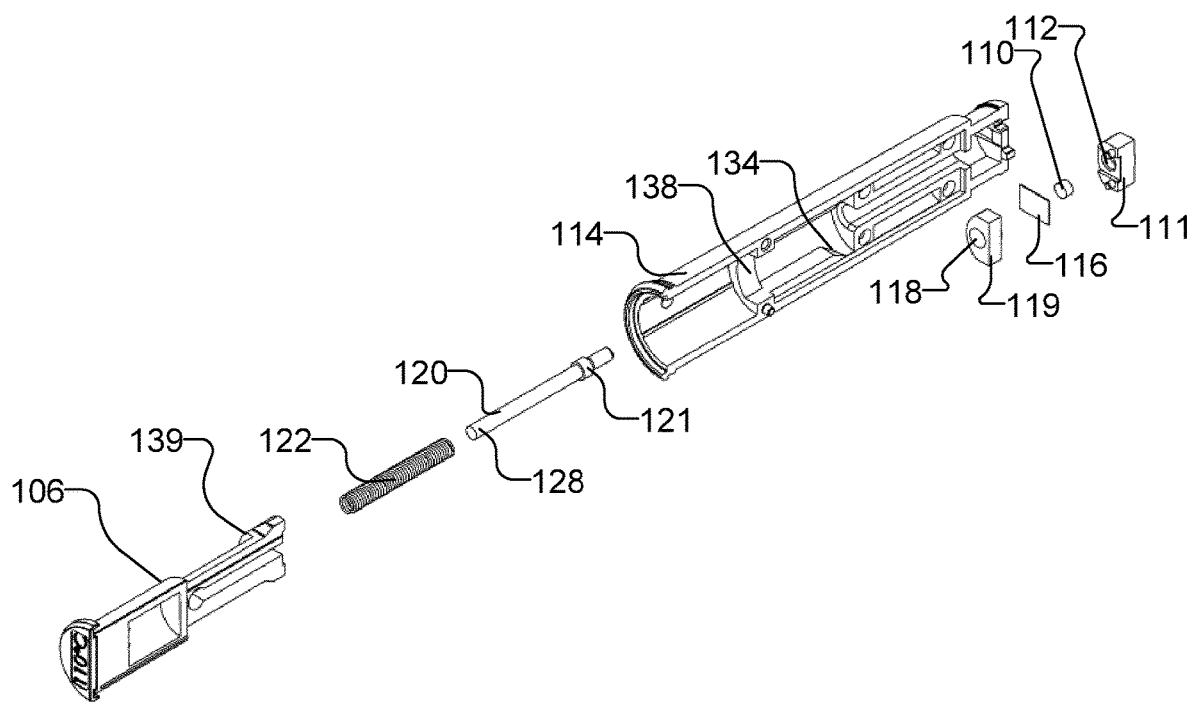

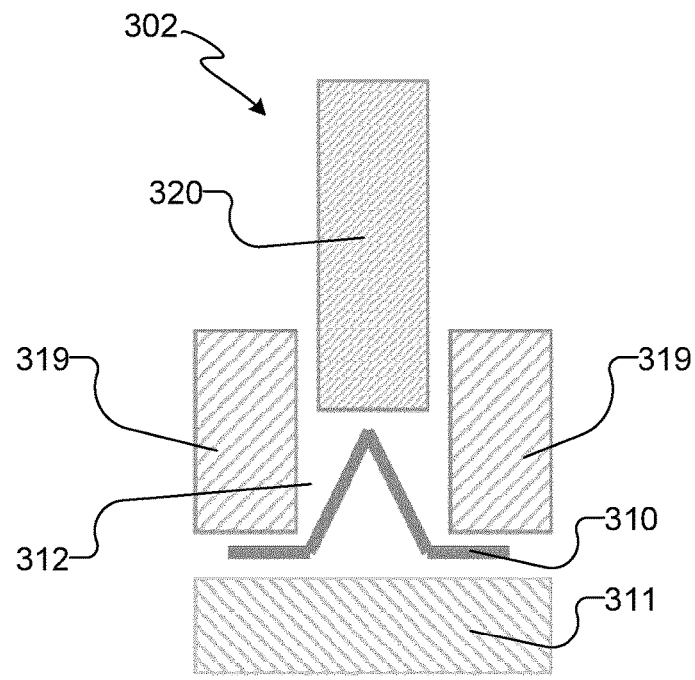
FIG. 17A
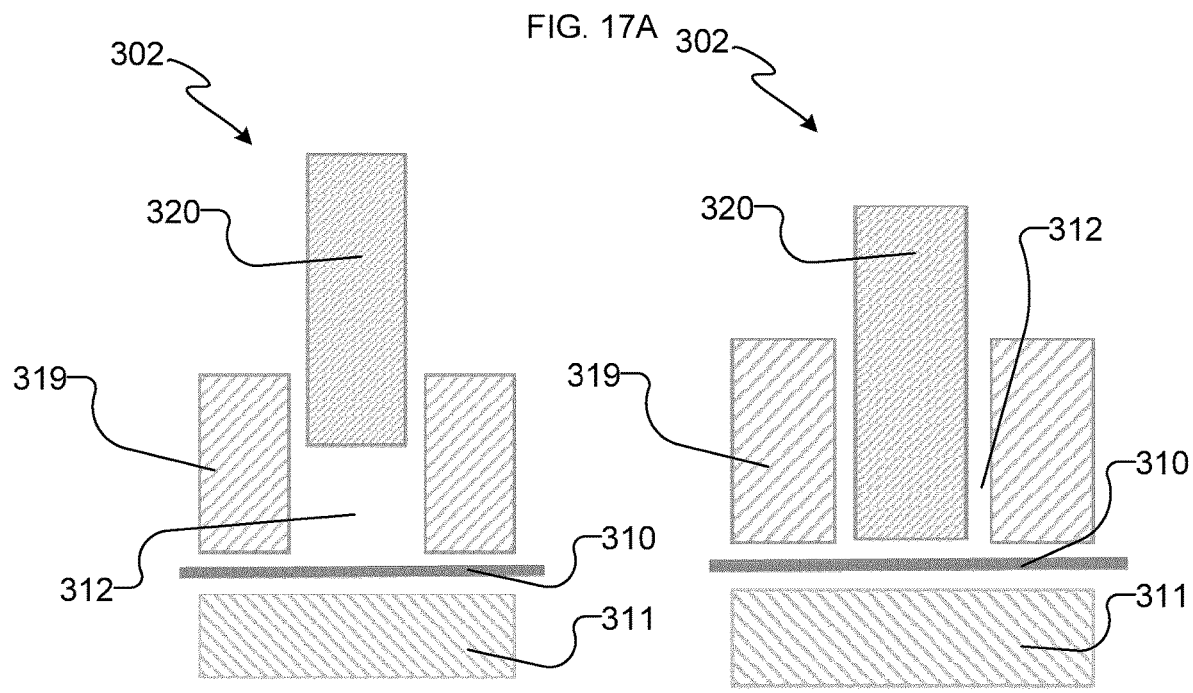
FIG. 17B
FIG. 17C

TEMPERATURE SENSOR AND INDICATOR

REFERENCE TO RELATED APPLICATIONS

This application is a 371 national phase entry of Patent Cooperation Treaty application No. PCT/CA2019/051009 filed 22 Jul. 2019, which claims priority to, and the benefit of, U.S. provisional patent application No. 62/702,166 filed 23 Jul. 2018. Both of the foregoing applications are hereby incorporated by reference herein their entireties for all purposes.

TECHNICAL FIELD

Some embodiments relate to apparatus for sensing increases in temperature above a predetermined threshold. Some embodiments relate to apparatus for providing a visual indication that temperature has increased above a predetermined threshold. Some embodiments relate to apparatus for sensing changes in temperature within electrical equipment above a predetermined threshold and providing a visual indication that a temperature change above the predetermined threshold has occurred within the piece of electrical equipment. Some embodiments relate to apparatus for sensing changes in temperature within electrical equipment above two distinct predetermined thresholds and providing a visual indication that only the lower temperature threshold or both the lower temperature threshold and the higher temperature threshold have been exceeded.

BACKGROUND

Electrical equipment is a common feature of modern society. Electrical power distribution grids use a variety of electrical equipment, such as transformers, capacitors, reactors and voltage regulators.

The life expectancy of electrical equipment such as transformers may be decreased as the operating temperature of the piece of electrical equipment is increased. For example, for some electrical equipment such as transformers, the life expectancy of the equipment may be reduced by as much as one-half for every approximately 5° C. to 10° C. increase in continuous operating temperature that the equipment experiences.

If a piece of electrical equipment is regularly or consistently operating at an elevated temperature, the piece of electrical equipment may fail prematurely (i.e. before the predicted lifespan of the electrical equipment has elapsed). It can be prudent to replace such a piece of electrical equipment with a piece of electrical equipment having a larger load capacity if it is regularly or consistently operating at a temperature higher than the desired operating temperature.

As an example, transformer loss-of-life is a function of both time and temperature, so the longer that a transformer is operating at an over-loaded temperature, the more the expected lifetime of the transformer is reduced. A brief over-load will not have a significant impact on the expected lifetime unless it is at very extreme temperatures; however, frequent over-loading will have a significant impact on the expected lifetime of the transformer. Therefore, if a transformer is slightly over-loaded, utilities will monitor further to determine if this is a regular occurrence or a chance event. If they find it to be a regular occurrence, they may replace the transformer with a larger version designed to handle higher loads. If the transformer is heavily over-loaded, it is a sign that a significant loss-of-life may have already occurred, and that the transformer is likely somewhat over-loaded on a regular basis.

Some utilities have developed practices for optimizing the lifetime of their equipment and the effort required to maintain it. Such practices may involve categorizing over-loaded equipment based on its operating temperature relative to a reference temperature and performing different actions based on such categorization. For example, if a transformer is designed to operate at a reference temperature of 90° C., a transformer may be categorized as 'over-loaded' if it is operating at 110° C. and 'extremely over-loaded' if it is operating at 120° C. A piece of equipment that is 'over-loaded' may be monitored more closely for a period of time, while equipment that is 'extremely over-loaded' may be replaced immediately.

There is a need to provide apparatus capable of sensing and indicating changes in temperature within electrical equipment to assist in determining if the electrical equipment is operating in an 'over-loaded' or 'extremely over-loaded' state. There is also a need to provide such apparatus wherein the indication of a change in temperature within the electrical equipment to determine whether the electrical equipment is operating in an 'over-loaded' or 'extremely over-loaded' state can be easily assessed visually from the exterior of the electrical equipment.

The foregoing examples of the related art and limitations related thereto are intended to be illustrative and not exclusive. Other limitations of the related art will become apparent to those of skill in the art upon a reading of the specification and a study of the drawings.

SUMMARY

In some aspects, a temperature sensor is provided. The temperature sensor has a heat-sensitive element contained within a chamber, the heat-sensitive element being selected to change configuration from a first configuration to a second configuration at a predetermined temperature, and a biased member biased toward the chamber, the biased member being initially prevented from entering the chamber when the heat-sensitive element is in the first configuration and movable into the chamber when the heat-sensitive element is in the second configuration. In some aspects, the heat-sensitive element is a material having a melting temperature corresponding to the predetermined temperature and the change in configuration is a phase change from a solid state to a liquid state, and the chamber has a portion that is formed from a selectively permeable element to retain the heat-sensitive element within the chamber when the heat-sensitive element is in a solid state, but to allow the heat-sensitive element to exit the chamber when the heat-sensitive element is in a liquid state. In some aspects, the selectively permeable element is a selectively permeable membrane. In some aspects, the selectively permeable membrane interposes the biased member and the heat-sensitive element.

In some aspects, an indicator is operatively engaged with the temperature sensor to provide a visual or other perceptible indication that the predetermined temperature has been exceeded. In some aspects, the indicator has a release mechanism that is operatively engaged with the biased member, and which is releasable upon movement of the biased member into the chamber.

In some aspects, a temperature sensor and indicator is provided having a shell with a generally axially extending bore with one or more angled retaining surfaces formed therein and a temperature sensor as described above. An indicator is positioned for sliding movement within the bore of the shell and has a proximal portion with at least one resilient activator foot having angled release surfaces, the angled release surfaces of each one of the at least one resilient activator foot being initially retained in contact with the corresponding at least one angled retaining surface on the shell by contact of a distal end of the biased member of the temperature sensor with the at least one resilient activator foot, and a surface for contacting the biasing element of the temperature sensor so that the biasing element applies a distal biasing force against the indicator, and a mechanism for providing an indication that the indicator has been released.

In some aspects, first and second temperature sensor and indicators are provided together, the first temperature sensor and indicator being configured to release at a low temperature and the second temperature sensor and indicator being configured to release at a high temperature. In some aspects, the first and second temperature sensor and indicators are provided in a single housing and can be independently removed from the housing and replaced with a different temperature sensor and indicator, for example that is configured to activate at a different predetermined temperature threshold.

In some aspects, a method of sensing an increase in temperature above a predetermined temperature threshold is provided. A heat-sensitive element is provided within a chamber, the heat-sensitive element being selected to change from a first configuration to a second configuration at the predetermined temperature threshold. A biased member is biased towards the chamber, and is initially prevented from entering the chamber when the heat-sensitive element is in the first configuration. After the temperature rises above the predetermined temperature threshold, the biased member is permitted to enter the chamber when the heat-sensitive element is in the second configuration. In some aspects, the heat-sensitive element has a first configuration that is solid and a second configuration that is liquid, and the step of permitting the biased member to enter the chamber when the heat-sensitive element is in the second configuration involves allowing the heat-sensitive element to flow out of the chamber through a selectively permeable element or membrane.

In some aspects, an indication that the temperature has exceeded a predetermined temperature threshold is provided. After an increase in temperature above a predetermined temperature threshold is sensed as described above, the biased member is allowed to move out of engagement with at least one indicator retaining foot of an indicator, and subsequently the at least one indicator retaining foot is allowed to move inwardly as a chamfered release surface on the at least one indicator retaining foot slides past a corresponding chamfered retaining surface provided on a sliding channel of a housing within which the indicator is axially movable, and allowing the indicator to move from an initial locked configuration to a released configuration.

In some aspects, an indication that the temperature has exceeded first and second predetermined temperature thresholds is provided by using a combination of two temperature sensing and indicating units, a first one of the temperature sensing and indicating units being configured to provide an indication that the temperature has exceeded the first predetermined temperature threshold and a second one of the temperature sensing and indicating units being configured to provide an indication that the temperature has exceeded the second predetermined temperature threshold.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1 is a side view of an example embodiment of two temperature sensors and indicators installed in an external housing, both in an unactivated configuration.

FIG. 2 is an exploded view of the components of an example embodiment of a temperature sensor and indicator, with the external housing omitted for clarity.

FIGS. 17A, 17B and 17C show schematically an example embodiment of a temperature sensor using a shape memory material as the temperature-sensitive element. FIG. 17A shows the temperature sensor in the unactivated configuration, FIG. 17B shows the temperature sensor in the activated configuration but with the actuator pin that would release the indicator still in the locked position, and FIG. 17C shows the temperature sensor in the activated configuration with the actuator pin that would release the indicator in the released position.

DESCRIPTION

Figure 3:
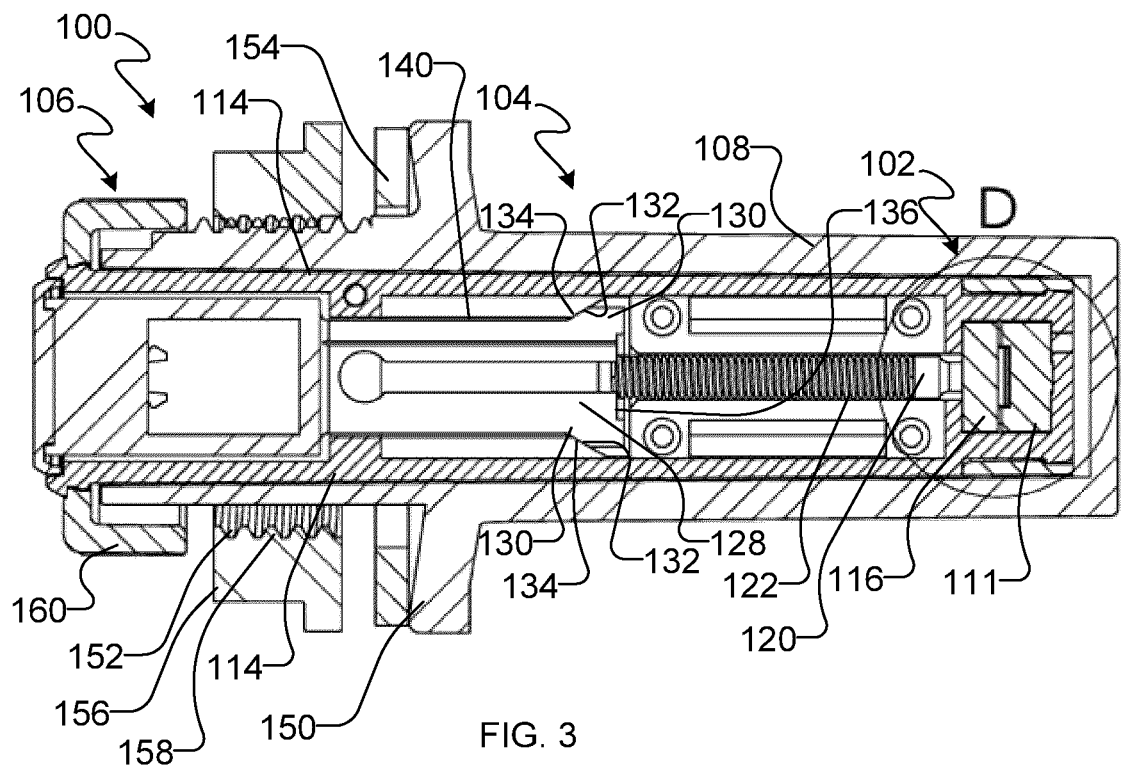
FIG. 3 is a sectional view of the embodiment of FIG. 1, showing one temperature sensor and indicator installed in an external housing.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The inventors have now developed a temperature sensor for determining when a temperature has exceeded a predetermined value. The sensor includes a heat-sensitive element. In some embodiments, the heat-sensitive element changes phase from solid to liquid at the predetermined temperature value. The heat-sensitive element occupies a space defined by a chamber. A selectively permeable retaining membrane is provided to secure the heat-sensitive element in place within the chamber while the heat-sensitive element is in the solid state. In the solid state, the heat-sensitive element cannot pass through the selectively permeable membrane. In the liquid state, the heat-sensitive element can pass through the selectively permeable membrane and exit the chamber.

In one embodiment, a biased member such as a biased pin is supported in its initial position by the solid heat-sensitive element. When the heat-sensitive element melts, the biased pin enters the chamber previously occupied by the heat-sensitive element. The biased pin can thus provide a trigger for a mechanical indicator to provide a visual indication that the heat-sensitive element has melted, and therefore that the predetermined temperature value corresponding to the melting point of the heat-sensitive element has been exceeded.

In one embodiment, the indicator is initially retained in a locked, unactivated configuration by the biased pin of the temperature sensor. The indicator has at least one or a plurality of activator feet which are resilient and have chamfered edges in engagement with corresponding chamfered retaining surfaces on the shell. When the spring-driven pin is in the unactivated position, the spring driven pin interposes the plurality of activator feet and prevents the activator feet from moving inwardly together.

In the unactivated configuration, the chamfered edges of the activator feet remain in the locked configuration against the corresponding chamfered retaining surfaces on the shell when the biased pin interposes the plurality of feet. A biasing member biases the indicator distally outwards; however, movement of the indicator is prevented by engagement of the activator feet with the shell. When the temperature sensor is activated by melting of the heat-sensitive element, the pin is permitted to enter the chamber, and is thereby removed from between the plurality of activator feet. When the pin is removed from between the plurality of activator feet, the plurality of activator feet can move inwardly, which they do in response to the inward force created by the chamfered retaining surfaces on the shell created by the biasing force of the biasing member that forces the indicator in the distal direction. This allows the chamfered edges on the activator feet to slide past the chamfered retaining surfaces of the shell, so that the indicator is biased longitudinally in the distal direction to move to its released configuration, to provide a visual indication that the temperature sensor has been activated.

As used in this specification, the term "proximal" means in a direction towards the end of the temperature sensor and indicator that would be positioned inside a piece of electrical equipment, e.g. inside a transformer, in use, and the term "distal" means the opposite of proximal, i.e. in a direction towards the end of the temperature sensor and indicator that would be positioned outside a piece of electrical equipment.

As used in this specification, the term "inner" or "inward" means in a direction towards the interior of the temperature sensor and indicator, and the term "outer" or "outward" has the opposite meaning, i.e. in a direction towards the external surface of the temperature sensor and indicator. As described in greater detail below, depending on the relative orientation of the components at issue, inwards may mean radially inwardly towards an axial centreline of the temperature sensor and indicator, or laterally towards a central plane extending through an axial centreline of the temperature sensor and indicator.

With reference to FIGS. 1, 3, 4A, and 5B, an example embodiment of a temperature sensor and indicator 100 is illustrated in its unactivated configuration. Temperature sensor and indicator 100 has a thermally activated element 102, an indicator release mechanism 104, and an indicator 106, as described in more detail below. An external housing 108 contains and supports the various components of temperature sensor and indicator 100 and can be secured to a piece of electrical equipment for use as described in greater detail below.

As most clearly seen in FIGS. 2, 4B, 4C and 5B, thermally activated element 102 has a heat-sensitive element 110 that occupies the volume of a first chamber 112. At least a portion of one edge of chamber 112 is defined by a selectively permeable membrane 116. First chamber 112 is initially fully sealed, so that heat-sensitive element 110 cannot flow or creep out of first chamber 112 when in its solid state. A second chamber 118 is provided on the opposite side of selectively permeable membrane 116. In the illustrated embodiment, second chamber 118 is defined within a solder washer 119.

Heat-sensitive element 110 is made from a material with a melting temperature selected so that heat-sensitive element 110 will melt or begin to melt at the predetermined temperature at which it is desired to have thermally activated element 102 activate. In some embodiments, heat-sensitive element 110 is a block of solder with a composition selected so that the melting temperature of the solder is the predetermined temperature. By varying the composition of the solder, the melting temperature can be changed. Thus, by selecting a solder with a composition that yields a melting temperature of the predetermined temperature, thermally activated element 102 can be designed to activate at the desired predetermined temperature.

Solders having different melting temperatures are commercially available, and a person skilled in the art can select a solder having a composition suitable for melting at a desired predetermined temperature. For example:

solder having a composition of 52.2 wt % In/46 wt % Sn/1.8 wt % Zn has a solidus temperature of 108° C. and a liquidus temperature of 108° C.;

solder having a composition of 51.6 wt % Bi/41.4 wt % Pb/7.0 wt % Sn has a solidus temperature of 98° C. and a liquidus temperature of 112° C.;

solder having a composition of 52 wt % In/48 wt % Sn has a solidus temperature of 118° C. and a liquidus temperature of 118° C.;

solder having a composition of 57 wt % Bi/43 wt % Sn has a solidus temperature of 139° C. and a liquidus temperature of 139° C.; and solder having a composition of 95.5 wt % Sn/3.8 wt % Ag/0.7 wt % Cu has a solidus temperature of 217° C. and a liquidus temperature of 217° C.

The solidus temperature is the highest temperature at which a composition is completely solid. The liquidus temperature is the lowest temperature at which a composition is completely liquid. In some embodiments, the solder is an eutectic solder. In some embodiments, the solder is a non-eutectic solder.

In the illustrated embodiment, first chamber 112 is generally cylindrical in shape and is defined within a base insert 111, and heat-sensitive element 110 is provided with a corresponding generally cylindrical shape in its initial solid form. It will be appreciated by those skilled in the art that alternative shapes for both first chamber 112 and heat-sensitive element 110 could be used in alternative embodiments, provided that heat-sensitive element 110 retains actuator pin 120 in the locked configuration until heat-sensitive element 110 melts, and provided that actuator pin 120 is then able to enter first chamber 112 when heat-sensitive element 110 melts.

Selectively permeable membrane 116 is in sealing engagement with base insert 111 to define first chamber 112. In the illustrated embodiment, selectively permeable membrane 116 is sandwiched in position between solder washer 119 and base insert 111.

Any suitable method of securing the selectively permeable membrane 116 in sealing engagement with base insert 111 to seal first chamber 112 could be used in alternative embodiments.

Figure 4A:
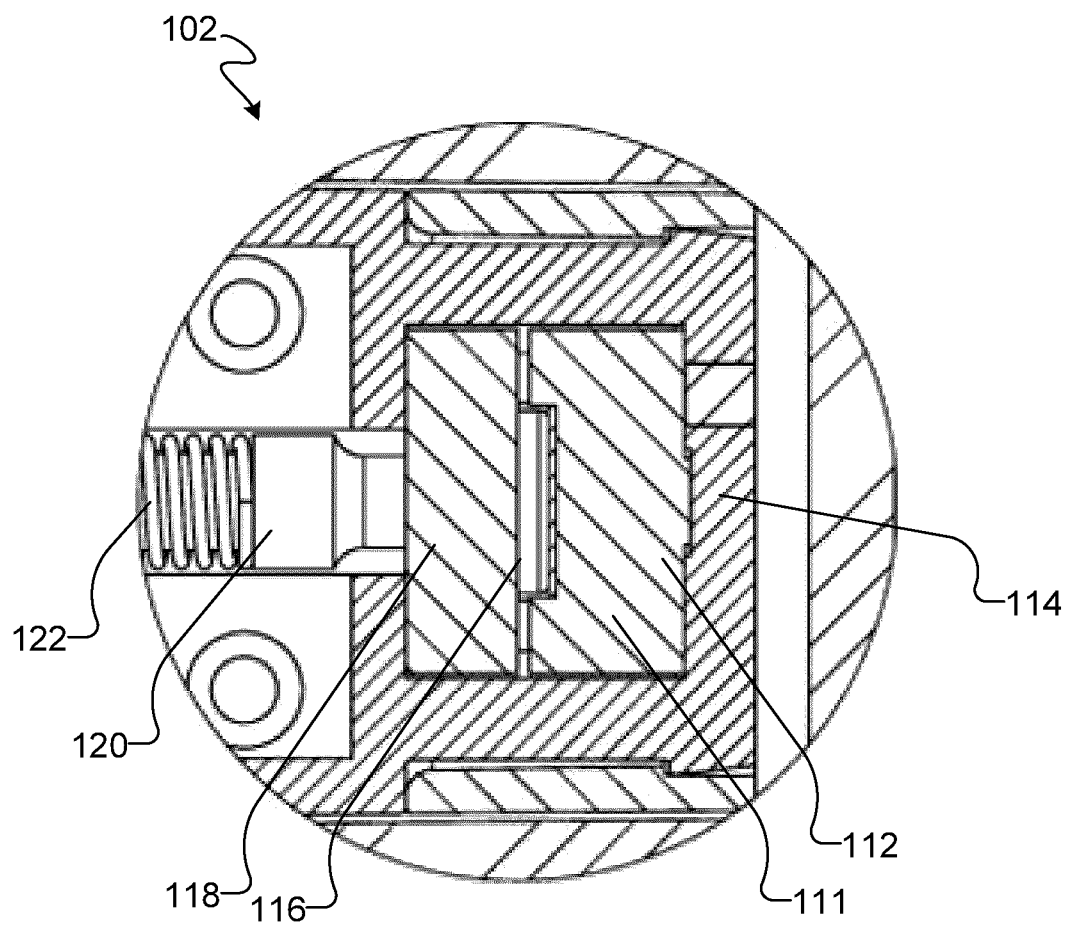
FIG. 4A is a partial enlarged view of a portion D of FIG. 3.
Figure 4B:
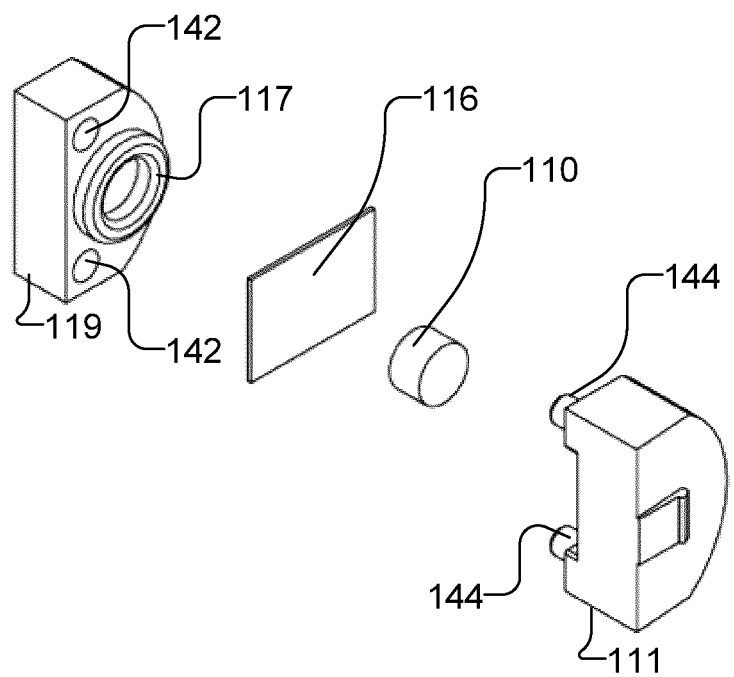
FIG. 4B is an exploded view of an example embodiment of components that define the first chamber.
Figure 4C:
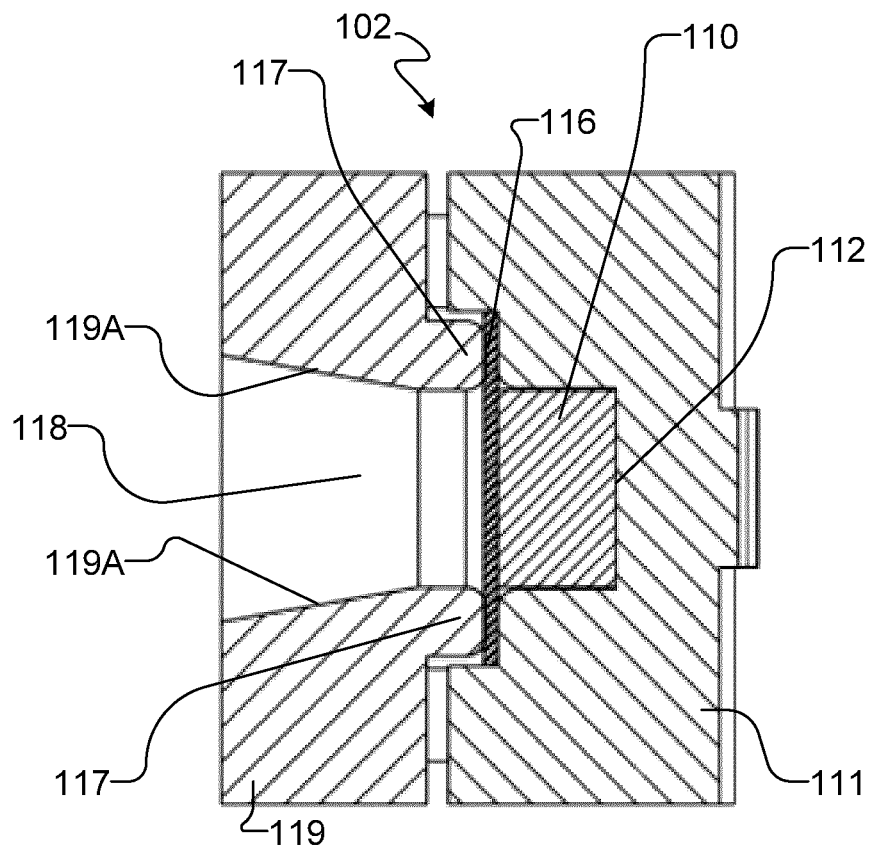
FIG. 4C is a cross-sectional view of those components in an assembled configuration.

In the illustrated embodiment, as best shown in FIGS. 4B and 4C, a sealing ring 117 is provided on the proximal surface of solder washer 119. Sealing ring 117 is a generally proximally projecting protrusion that interposes solder washer 119 and membrane 116, to thereby form a compression seal when solder washer 119 and base insert 111 are compressed together within shell 114 to maintain a good seal between membrane 116 and base insert 111. In the illustrated embodiment, sealing ring 117 is integrally formed with solder washer 119. In alternative embodiments, sealing ring 117 could be provided as a separate element coupled to solder washer 119 in any suitable manner, or sealing ring 117 could be provided as a distally extending projection on the distal surface of base insert 111, either formed integrally or as a separate element secured to base insert 111.

In alternative embodiments, alternative mechanisms of providing a sealing engagement between membrane 116 and base insert 111 to define first chamber 112 could be used, for example suitable adhesives, ultrasonic welding, or the like.

In the illustrated embodiment, solder washer 119 is provided with a pair of apertures 142 and base insert 111 is provided with a corresponding pair of projections 144 that are engageable within apertures 142 when assembled, to help facilitate the engagement of these components in the correct orientation. In alternative embodiments, apertures 142/projections 144 could be omitted, or other mechanisms such as a tongue-and-groove engagement within shell 114 could be used.

Selectively permeable membrane 116 is selected to be impermeable to heat-sensitive element 110 when heat-sensitive element 110 is in the solid state, but to be permeable to heat-sensitive element 110 when heat-sensitive element 110 is in its liquid state. The nature of the material used for selectively permeable membrane 116 may vary depending on the nature of the heat-sensitive element 110. The material used for selectively permeable membrane 116 should be selected to have a pore size suitable to prevent flow or creep of heat-sensitive element 110 through selectively permeable membrane 116 when heat-sensitive element 110 is in the solid state, but to allow flow of heat-sensitive element 110 through selectively permeable membrane 116 when heat-sensitive element 110 is in the liquid state.

The material used for selectively permeable membrane 116 should also be selected to be chemically compatible with the material used for heat-sensitive element 110 (e.g. to avoid undesired chemical reactions or the diffusion of chemical elements, ions or molecules between selectively permeable membrane 116 and heat-sensitive element 110). The material used for selectively permeable membrane 116 should also be heat resistant, e.g. so that selectively permeable membrane 116 will not itself melt or degrade in the anticipated range of operating temperatures of temperature sensor and indicator 100.

Examples of materials that could be used to provide selectively permeable membrane 116 in various embodiments include sintered stainless steel, ceramic, or a fine mesh or porous membrane made from a suitable material such as plastic, nylon, or metal.

In some embodiments, permeable membrane 116 can be made from a porous foam, provided that the foam has a sufficient amount of continuous pores to allow the heat-sensitive element 110 to flow therethrough in its liquid form. In some embodiments, selectively permeable membrane 116 is made from plastic, and the plastic is polytetrafluoroethylene (PTFE) (e.g. Teflon®).

In some embodiments, the pore size of selectively permeable membrane 116 is in the range of 0.2 to 10 µm, including any value therebetween, e.g. 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0 or 9.5 µm. In embodiments in which selectively permeable membrane 116 is a plastic membrane, the membrane may have a pore size in the range of 0.2 to 10 µm, including any value therebetween, e.g. 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0 or 9.5 µm.

In embodiments such as those illustrated in FIGS. 1-7, in which selectively permeable membrane 116 is deformed to allow actuator pin 120 to enter first chamber 112, selectively permeable membrane 116 should be sufficiently flexible to allow for movement of actuator pin 120 into first chamber 112. In alternative embodiments, selectively permeable membrane 116 could be permitted to rupture once it starts to deform after heat-sensitive element 110 has started to flow through it and therefore selectively permeable membrane 116 could in such embodiments be made from a non-flexible material.

As an example, in embodiments in which heat-sensitive element 110 is solder, selectively permeable membrane 116 can be polytetrafluoroethylene (PTFE) (e.g. Teflon®). In some embodiments, the polytetrafluoroethylene has a pore size in the range of 0.2 to 10 μm, including any value therebetween, e.g. 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0 or 9.5 μm.

Thermally activated element 102 further comprises an actuator pin 120 that is biased against heat-sensitive element 110. In the illustrated embodiment, membrane 116 interposes actuator pin 120 and heat-sensitive element 110. In the illustrated embodiment, actuator pin 120 is biased against heat-sensitive element by coil spring 122. A contact surface 123 is provided on a projection towards the proximal end of actuator pin 120 to contact coil spring 122 and allow the coil spring 122 to bias actuator pin 120 towards first chamber 112. In alternative embodiments, any suitable biasing mechanism could be used to bias actuator pin 120 towards first chamber 112, such as the weight of the pin under force of gravity, an extension spring, or stretched elastic material.

In some embodiments, including embodiments in which heat-sensitive element 110 is solder, even at temperatures below its melting temperature, heat-sensitive element 110 may experience slow deformation or "creep" due to the pressure applied by actuator pin 120. In such embodiments, membrane 116 acts to prevent or minimize the amount of deformation or creep experienced by heat-sensitive element 110, and in particular retains heat-sensitive element 110 within first chamber 112 so that the volume of first chamber 112 continues to be occupied by heat-sensitive element 110 so long as heat-sensitive element 110 is in the solid state. Because the volume of first chamber 112 is occupied by heat-sensitive element 110, actuator pin 120 cannot enter first chamber 112, notwithstanding the force applied by coil spring 122.

Figure 7:
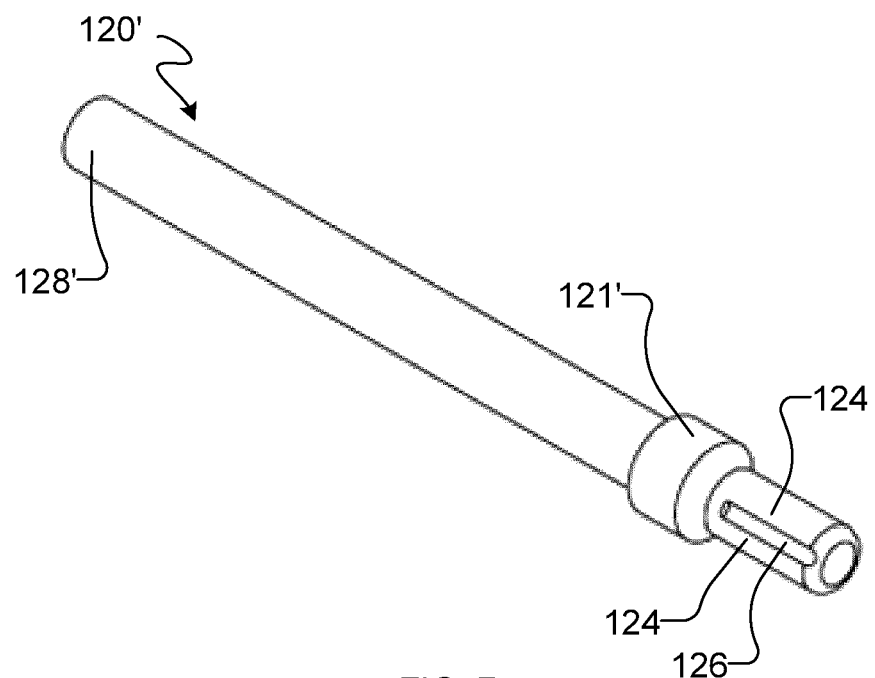
FIG. 7 is a perspective view of an example embodiment of an actuator pin.

In some embodiments, including the illustrated embodiment shown in FIG. 7, actuator pin 120' is provided with structural features to maximize the surface area of actuator pin 120' in contact with membrane 116 (and therefore the surface area of actuator pin 120' that is applying force against heat-sensitive element 110), while still allowing heat-sensitive element 110 to flow past the proximal portion of actuator pin 120' when heat-sensitive element 110 is in the liquid phase. In the illustrated embodiment of FIG. 7, actuator pin 120' is provided with one or more surface ridges 124 at its proximal end 121'. Surface ridges 124 define one or more fluid flow channels 126 therebetween, to allow heat-sensitive element 110 to flow past actuator pin 120 into second chamber 118 when heat-sensitive element 110 is in a liquid state. In alternative embodiments, e.g. as illustrated in FIG. 2, actuator pin 120 has no fluid flow channels and no surface ridges.

Figure 5C:
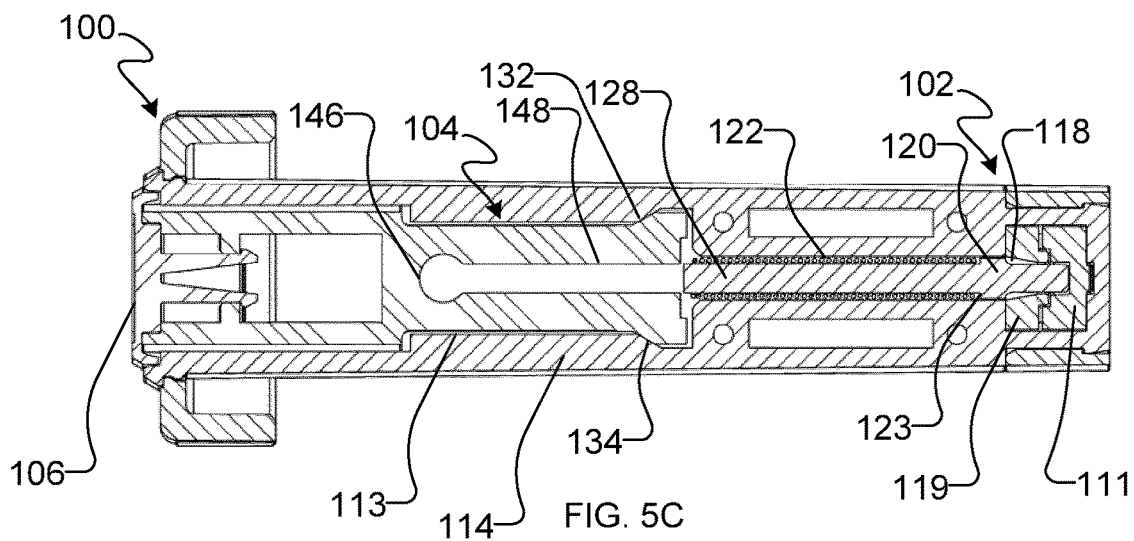
FIG. 5C is a sectional view thereof when the indicator pin has moved to the activated configuration, but while the indicator feet are still in the locked position and have not yet started to slide relative to the chamfered retaining surfaces of the shell.
Figure 6A:
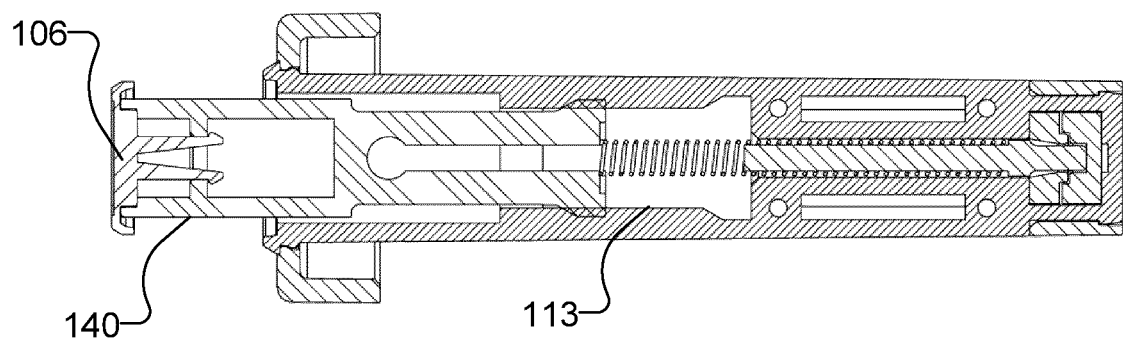
FIG. 6A is a sectional view of an example embodiment of a temperature sensor and indicator in the activated configuration, with the indicator in the released position and the external housing omitted for clarity. Although the indicator feet are shown as interfering with the shell in FIG. 6A, this is an artifact of the drawing model used. In actual construction, the indicator feet are resilient and would flexibly press against and contact the shell, but would not extend therethrough.
Figure 6B:
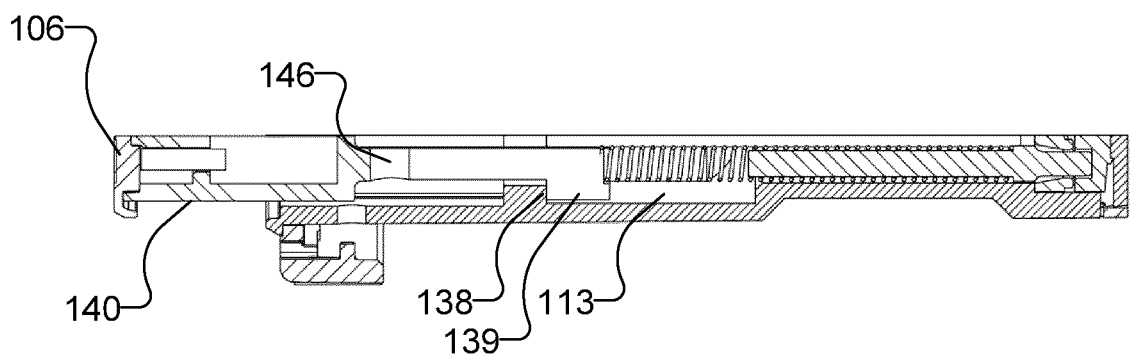
FIG. 6B is a sectional view of the embodiment of FIG. 6A, showing the engagement of a projection on the indicator with a hard stop on the inner surface of the shell to prevent full ejection of the indicator.

When the predetermined temperature threshold is reached, heat-sensitive element 110 melts, changing from the solid phase to the liquid phase. Selectively permeable membrane 116 is permeable to heat-sensitive element 110 in its liquid form. In some embodiments, a biasing pressure is applied by coil spring 122 forcing actuator pin 120 into first chamber 112 and membrane 116 is sufficiently flexible to allow movement of actuator pin 120 into first chamber 112, actuator pin 120 begins to move proximally into first chamber 112, forcing the liquid form of heat-sensitive element 110 to flow through membrane 116 and out fluid flow channels 126 (if present) into second chamber 118. In embodiments in which fluid flow channels 126 are not present, the liquid form of heat-sensitive element 110 flows out of first chamber 112 into second chamber 118 through gaps and tolerances between actuator pin 120 and solder washer 119. The evacuation of the liquid form of heat-sensitive element 110 from first chamber 112 allows actuator pin 120 to move into first chamber 112, thus placing thermally activated element 102 in the activated configuration as shown in FIGS. 5C, 6A and 6B.

In the illustrated embodiment, second chamber 118 is defined at least partially by a solder washer 119. In the illustrated embodiment, second chamber 118 is defined bys a generally cylindrical internal aperture extending through solder washer 119, and the proximal end 121 of actuator pin 120 extends though the cylindrical second chamber 118 so that solder washer 119 helps to maintain alignment of actuator pin 120 with first chamber 112. In the illustrated embodiment, as best seen in FIG. 4C, the inner wall of solder washer 119 that defines second chamber 118 has a tapered surface 119A that tapers radially inwardly in the proximal direction. In some embodiments, the tapered surface 119A of the inner wall of solder washer 119 facilitates assembly. In some embodiments, the inner wall of solder washer 119 is not tapered, i.e. is a generally cylindrical shape with straight sides. Second chamber 118 should have a sufficient volume to receive the volume of liquid heat-sensitive element 110 that is displaced through membrane 116 by actuator pin 120.

With reference to FIGS. 3, 5B, 5C, 6A and 6B, indicator release mechanism 104 is described in greater detail. Indicator 106 is disposed for axial sliding movement within a sliding channel 113 defined within shell 114. In the unactivated position shown in FIGS. 3 and 5B, the distal end 128 of actuator pin 120 sits inwardly of and interposes a plurality of activator feet 130. In the illustrated embodiment, a pair of laterally opposed activator feet 130 are provided on the proximal portion of indicator 106. When indicator release mechanism 104 is activated, each activator foot 130 is caused to move laterally inwardly toward the opposing activator foot 130. In alternative embodiments, any desired number of activator feet can be used, e.g. 1, 2, 3, 4 or more activator feet. In some embodiments, rather than being laterally opposed, activator feet 130 may be distributed around the circumference of the proximal portion of indicator 106. In such embodiments, when indicator release mechanism 104 is activated, each activator foot is caused to move radially inwardly towards an axial centreline of indicator 106.

Each one of activator feet 130 has a chamfered release surface 132 on an outer edge thereof that tapers outwardly from a distal portion to a proximal portion thereof. Although the indicator feet are shown as interfering with the shell in FIG. 6A, this is an artifact of the drawing model used. In actual construction, the indicator feet are resilient and would flexibly press against and contact the shell, but would not extend therethrough.

Figure 5A:
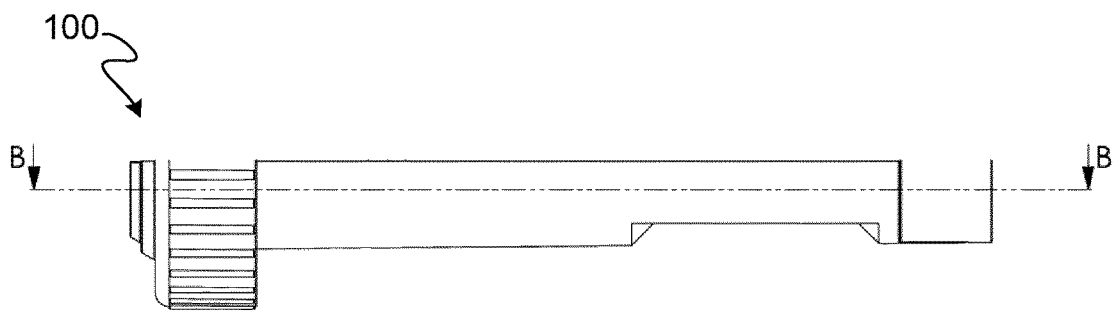
FIG. 5A is a side view of an example embodiment of a temperature sensor and indicator with the external housing omitted for clarity.
Figure 5B:
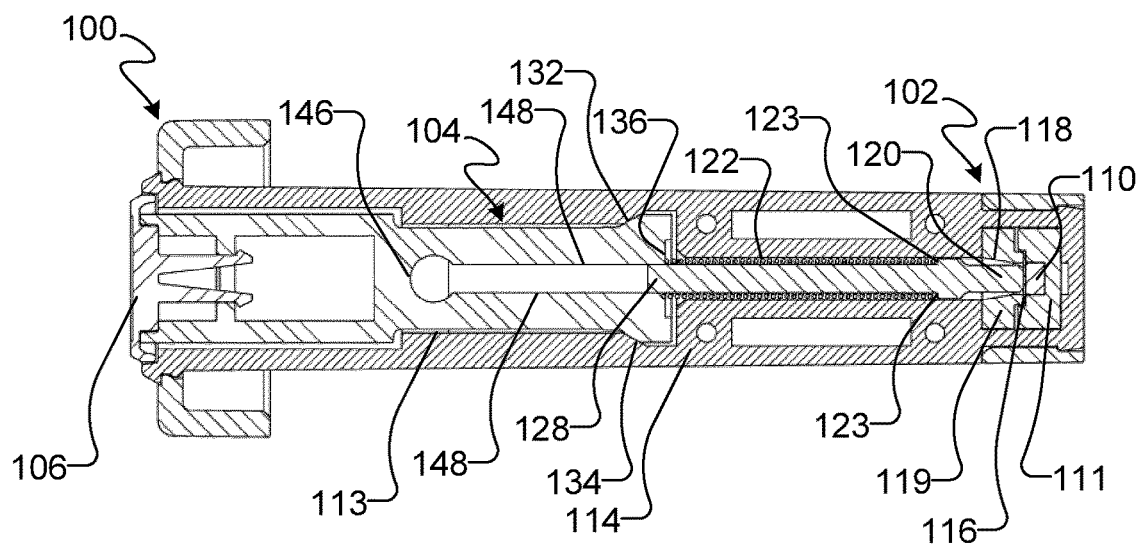
FIG. 5B is a sectional view thereof taken along line B-B of FIG. 5A, in the unactivated configuration.

As shown in e.g. FIG. 5B, the space defined between activator feet 130 in indicator release mechanism 104 in the illustrated embodiment has a keyhole shape, having a generally rounded distal portion 146 and generally straight edges 148 at the proximal portion thereof. The keyhole shape shown in the illustrated embodiment reduces stress concentration between the pair of activator feet 130, and further can be modified in shape to adjust the flexibility of activator feet 130.

Chamfered release surfaces 132 are held in place by engagement with corresponding chamfered retaining surfaces 134 of shell 114. Chamfered retaining surfaces 134 taper outwardly from a distal portion to a proximal portion thereof in a manner complementary to chamfered release surfaces 132. Chamfered release surfaces 132 and chamfered retaining surfaces 134 are thus configured to slide past one another when temperature sensor and indicator 100 is activated, as described in greater detail below.

Other shapes and configurations for surfaces 132, 134 could be used in alternative embodiments, so long as surfaces 132, 134 can initially retain indicator release mechanism 104 in an unactivated configuration and allow indicator release mechanism 104 to move to an activated configuration when thermally activated element 102 is activated.

In the unactivated position, a biasing mechanism such as coil spring 122 applies an axial biasing force against activator feet 130 in the distal direction, for example via engagement with a contact surface 136 provided on a proximally facing surface of indicator release mechanism 104. Because distal end 128 of actuator pin 120 prevents activator feet 130 from deflecting inwardly, chamfered release surfaces 132 remain locked in place against chamfered retaining surfaces 134, and activator feet 130 cannot move when actuator pin 120 is in its unactivated configuration.

When thermally activated element 102 is activated by the melting of heat-sensitive element 110, temperature sensor and indicator 100 moves into the activated configuration, as shown in FIG. 5C with indicator release mechanism 104 still in the locked configuration, i.e. in which activator feet 130 are illustrated in the locked configuration. In the activated configuration, actuator pin 120 has moved sufficiently far axially in the proximal direction that its distal end 128 no longer interposes activator feet 130. In response to the biasing force applied by coil spring 122, activator feet 130 can thus begin to slide in the distal direction and, because actuator pin 120 has been removed from therebetween, activator feet 130 can begin to deflect inwardly towards one another. Continued movement of activator feet 130 inwardly together and in the distal direction longitudinally as chamfered release surfaces 132 slide past chamfered retaining surfaces 134 allows coil spring 122 to bias indicator release mechanism 104, and thus indicator 106, into the released position.

Once released, activator feet 130 continue to slide distally within shell 114 until a projection 139 provided on indicator 106 reaches a hard stop 138. In the illustrated embodiment, hard stop 138 is a radially inwardly extending projection formed on the interior sidewall of shell 114, and projection 139 is a radially outwardly extending projection formed on a portion of indicator 106. In the illustrated embodiment, projection 139 is formed on a portion of indicator 106 between activator feet 130. However, projection 139 could be provided at any desired location in alternative embodiments, so long as hard stop 138 is positioned to contact projection 139. This prevents complete ejection of indicator 106, while the biasing force applied by coil spring 122 ensures that indicator 106 remains in its fully extended position, so that it will be visible upon visual inspection.

In alternative embodiments, any other structural element suitable for stopping the distal movement of indicator 106 could be used. In alternative embodiments in which it is desired to fully eject indicator 106, a stop mechanism such as hard stop 138 can be omitted.

As a result of the release of activator feet 130, indicator 106 is ejected axially in the distal direction, away from shell 114, into its released configuration. In some embodiments, indicator 106 can be provided with a bright colour on its outer surface 140, which is hidden from view in the locked configuration, but rendered visible in the released configuration. A worker inspecting a piece of electrical equipment can thus readily determine whether temperature sensor and indicator 100 has been activated. In alternative embodiments, indicator 106 can be provided with a surface that is provided with a distinctive pattern, texture or shape in place of a bright colour on outer surface 140. In some embodiments, the relative length of indicator 106 that is projecting from external housing 108 is used to provide a visual assessment that indicator 106 has been released. In further alternative embodiments, other ways of providing a signal that indicator 106 has been released besides the rendering visible of surface 140 could be used, e.g. the breaking or connection of an electrical circuit between a portion of indicator 106 and another portion of temperature sensor and indicator 100 could be used to provide an electrical signal that indicator 106 has been released, and/or could be used to trigger generation of an audible or visible indication, e.g. a warning tone or activation of a warning light.

In the illustrated embodiment, temperature sensor and indicator 100 is secured to a piece of electrical equipment, e.g. a transformer, via external housing 108. External housing 108 is provided with a radially extending collar 150 and a threaded surface 152. In use, the distal end of external housing 108 can be passed through a suitable aperture provided in the enclosure of the electrical equipment, illustrated as enclosure 23 of FIG. 8, from the inner side of the electrical equipment, so that threaded surface 152 extends outside the outer surface of the enclosure of the electrical equipment, and collar 150 extends adjacent the enclosure of the electrical equipment on the inner surface of the enclosure. In some embodiments, a washer 154 is provided to interpose collar 150 and the enclosure of the electrical equipment, to form a seal between collar 150 and the enclosure of the electrical equipment.

To secure temperature sensor and indicator 100 in place, a nut 156 having an inner threaded surface 158 is threadedly engaged with threaded surface 152 on external housing 108 and tightened. In alternative embodiments, any other suitable engagement mechanism could be used to secure nut 156 in place on external housing 108, e.g. a suitably tight friction fit, suitable adhesives, ultrasonic welding, or the like. In the illustrated embodiment, a cover 160 is provided to secure shell 114 within external housing 108.

Figure 8:
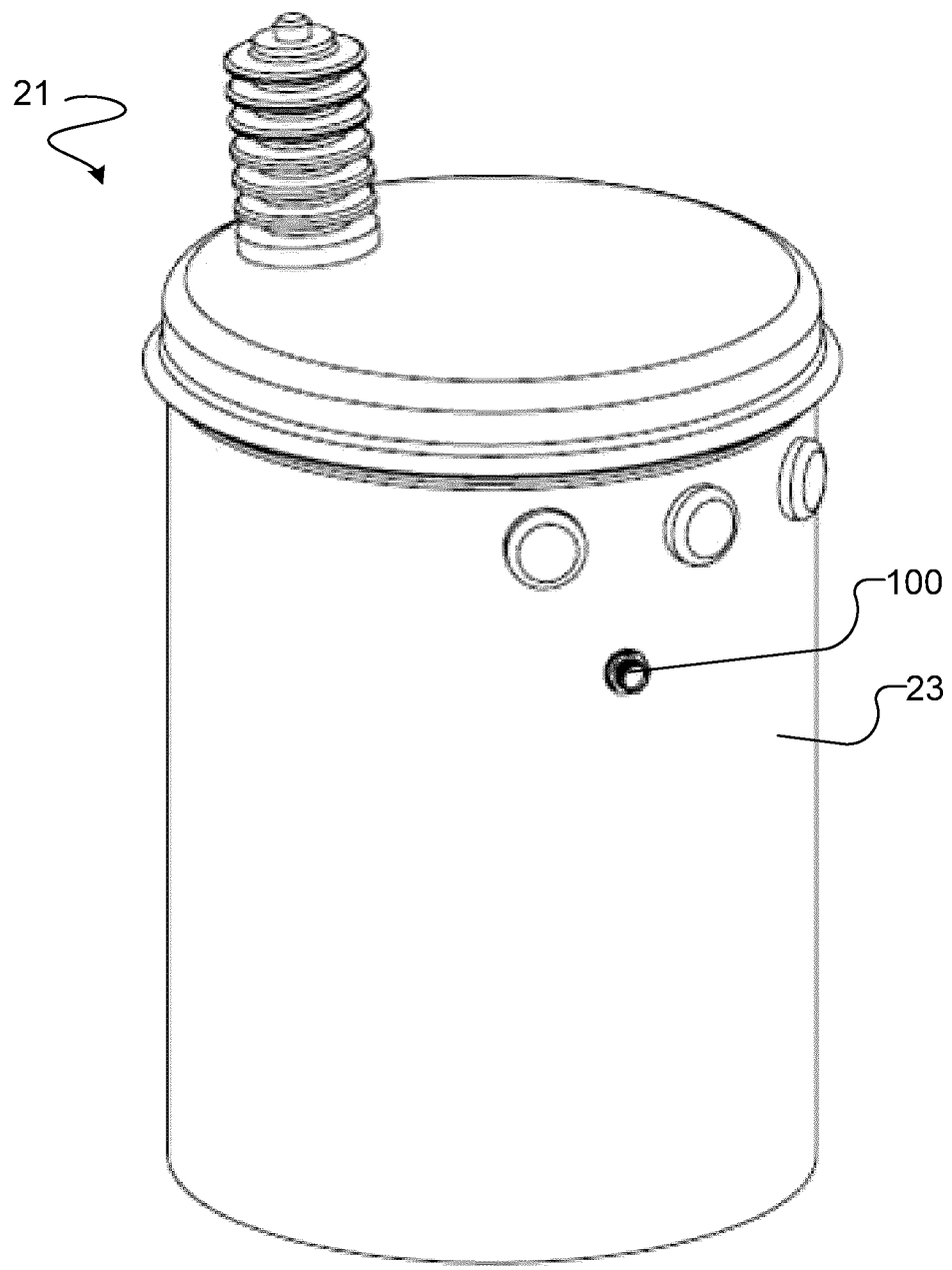
FIG. 8 is an example embodiment of a transformer with a temperature sensor and indicator mounted therein.

In some embodiments, as illustrated schematically in FIG. 8, temperature sensor and indicator 100 is mounted to a side of the enclosure 23 of the electrical equipment 21 in which it is installed, to assist in rendering indicator 106 visible to a user inspecting the electrical equipment when indicator 106 is in the released configuration. In some embodiments, temperature sensor and indicator 100 is mounted on an oil-filled transformer at a suitable elevation so that temperature sensor and indicator 100 is measuring a temperature of the oil contained within the oil-filled transformer. In some such embodiments, the temperature sensor and indicator 100 measures the temperature of the upper region of the oil, or the top oil of the transformer. In some example embodiments, mounting the temperature sensor and indicator 100 approximately 5 cm or more below the oil-level is an acceptable position to ensure that oil temperature is being measured.

In alternative embodiments, the temperature sensor and indicator 100 can be mounted in the air space above the level of fluid in a fluid-filled transformer, although adjustments to the configuration of the temperature sensor and indicator 100 might need to be made as compared with an equivalent temperature sensor and indicator 100 mounted to measure the temperature of the fluid, because the air temperature and fluid temperature may be slightly different. In alternative embodiments where the temperature sensor and indicator 100 is used with a dry-type transformer, considerations with respect to measuring fluid temperature versus air temperature would be absent. It would be within the expected ability of one skilled in the art to adjust the temperature sensor and indicator to suit its desired position of deployment.

In some embodiments, as illustrated in FIGS. 9-13, a temperature sensor and indicator 200 comprises a pair of temperature sensor and indicators 200A, 200B, which are provided together in a single external housing 208. Components of temperature sensor and indicators 200A, 200B that correspond to components of temperature sensor and indicator 100 are referred to by reference numerals incremented by 100. Each of temperature sensor and indicators 200A, 200B are generally similar to temperature sensor and indicator 100.

In some embodiments, each one of temperature sensor and indicators 200A, 200B is self-contained within its own shell 214A, 214B, so that temperature sensor and indicators 200A, 200B are each self-contained modules that are independently replaceable within external housing 208. In the illustrated embodiment, a separation shield 215A, 215B is provided as an interior component of each of shells 214A, 214B. Separation shield 215A/215B can help to prevent interference of coil springs 222A/222B. Each one of temperature sensor and indicators 200A, 200B is provided with a half-cylinder shape that is generally symmetrical, so that they can be easily installed within the generally cylindrical shape of external housing 208.

In the illustrated embodiment, a snap ring 262 and a capsule cover 260 are provided so that shells 214A, 214B can be readily engaged together as a single module for insertion into external housing 208. When capsule cover 260 is removed, either or both of shells 214A, 214B can be snapped out of snap ring 262 and replaced, e.g. so that a different temperature sensor and indicator unit that will activate at a different predetermined temperature can be readily installed in external housing 208. In some embodiments, temperature sensor and indicators like 200A, 200B are sold as individual units, so that a purchaser can readily replace a temperature sensor and indicator 200A, 200B that has been activated and/or install a temperature sensor and indicator 200A, 200B that will activate at a different predetermined temperature.

Each one of temperature sensors 200A, 200B can be independently selected to have a thermally actuated element 202A, 202B that activates at desired predetermined temperature thresholds, and each one of temperature sensors 200A, 200B can be independently installed and replaced in external housing 208. This allows a user to determine and install, for example in the field, a pair of temperature sensors 200A, 200B which will actuate at the correct predetermined temperatures for a particular application. This also allows, for example, a user to remove and replace a first temperature sensor and indicator 200A that has been activated, while leaving an unactivated temperature sensor and indicator 200B intact and undisturbed within external housing 208 before reinstalling external housing 208 in the piece of electrical equipment from which it was removed.

Temperature sensor and indicator 200A is configured to activate at a first predetermined temperature (referred to herein as the "low temperature threshold"), and temperature sensor and indicator 200B is configured to activate at a second predetermined temperature (referred to herein as the "high temperature threshold") that is higher than the first predetermined temperature. That is, the heat-sensitive element 210A in temperature sensor and indicator 200A is selected to melt at the first predetermined temperature, and the heat-sensitive element 210B in temperature sensor and indicator 200B is selected to melt at the second predetermined temperature.

In some embodiments, the low temperature threshold is selected to be a temperature at which the operator considers that the piece of electrical equipment in which temperature sensor and indicator 200 is installed is overloaded. In some embodiments, the high temperature threshold is selected to be a temperature at which the operator considers that the piece of electrical equipment in which temperature sensor and indicator 200 is installed is extremely overloaded.

Figure 9:
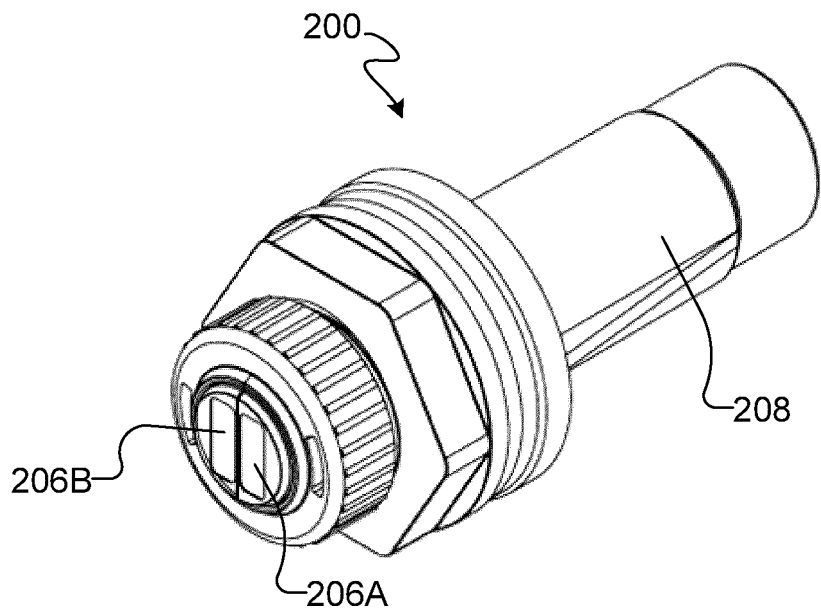
FIG. 9 is a perspective view of an example embodiment of a temperature sensor and indicator that is capable of sensing and indicating that two distinct temperature thresholds have been exceeded, installed in an external housing in its fully unactivated configuration.

In some embodiments, temperature sensor 200A and temperature sensor 200B are provided with two different indicators 206A, 206B, that yield perceptibly distinct visual indications that either temperature sensor and indicator 200A or temperature sensor and indicator 200B has been activated. For example, in the illustrated embodiment, FIG. 9 shows temperature sensor and indicator 200 in the fully unactivated position.

Figure 10:
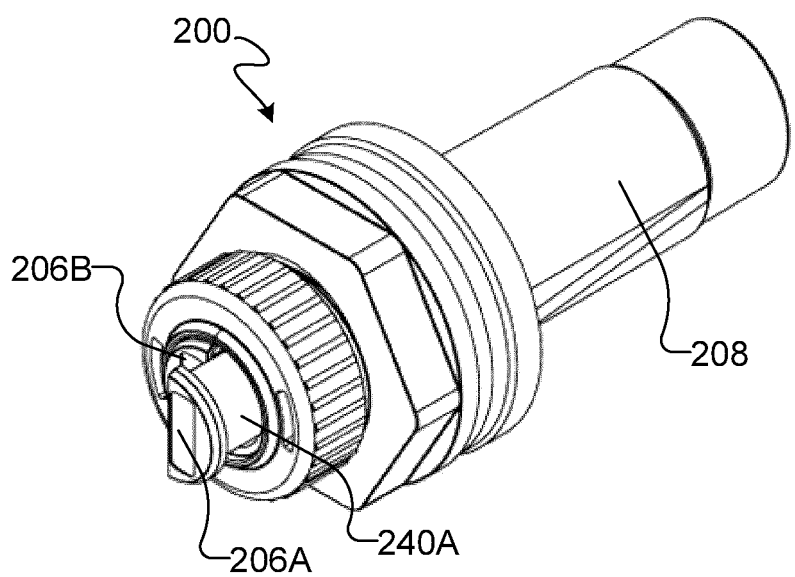
FIG. 10 is a perspective view of the example embodiment of FIG. 9, in which the indicator indicating that the lower temperature threshold has been exceeded is in its released configuration, but the indicator indicating that the higher temperature threshold has been exceeded is in its unactivated configuration.

As shown in FIG. 10, once the low temperature threshold has been exceeded, first indicator 206A is released and extends a first distance 180 (FIG. 12) distally of the distal end of external housing 208. Outer surface 240A of first indicator 206A is thus rendered visible.

Figure 11:
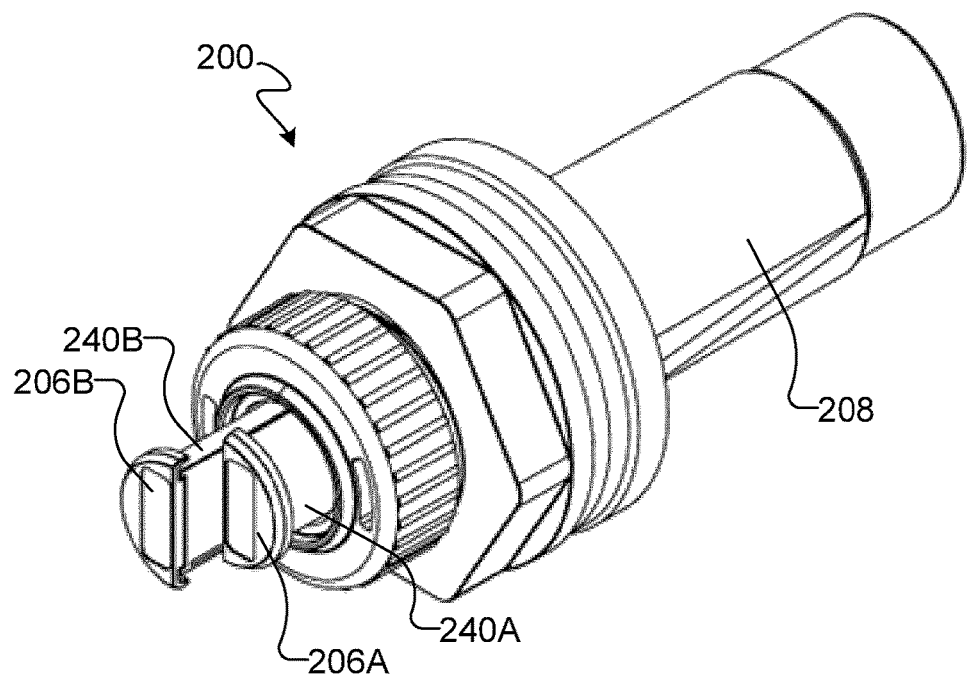
FIG. 11 is a perspective view of the example embodiment of FIG. 9, in which both the low temperature threshold indicator and the high temperature threshold indicator are in their released configurations.
Figure 12:
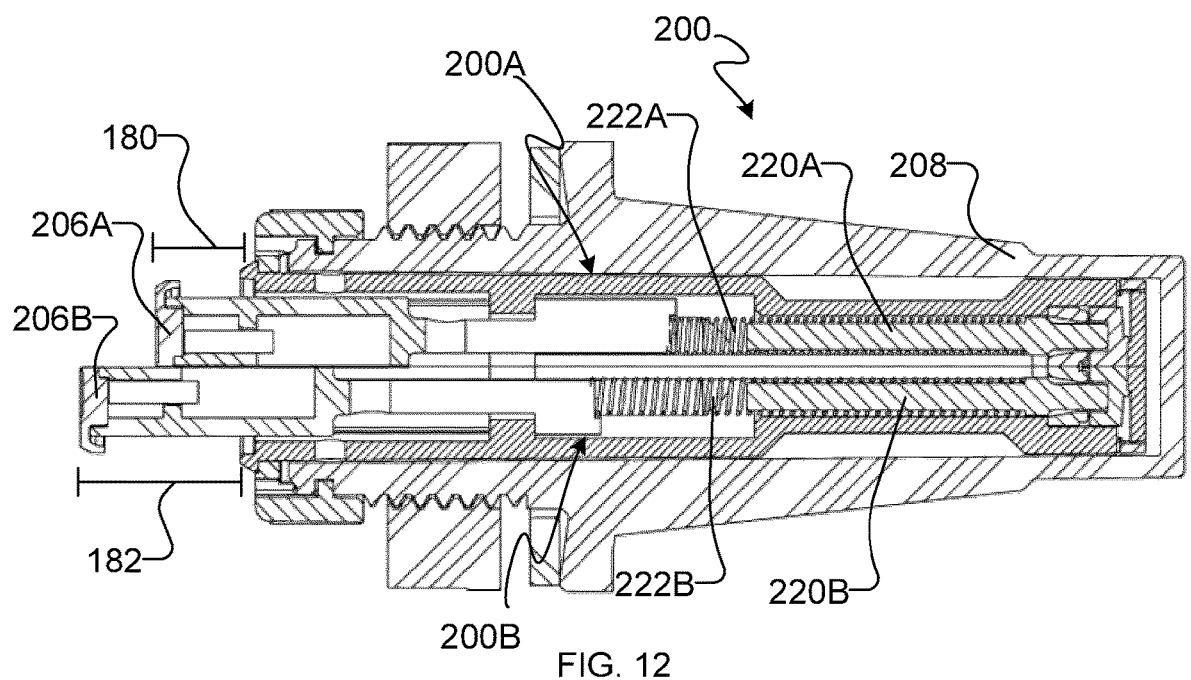
FIG. 12 is a sectional view of the temperature sensor and indicator shown in FIG. 11, with both the low temperature threshold indicator and the high temperature threshold indicator in their released configurations.

As shown in FIGS. 11 and 12, once the high temperature threshold has been exceeded, second indicator 206B is released and extends a second distance 182 distally of the distal end of external housing 208. Outer surface 240B of second indicator 206B is thus rendered visible.

In the illustrated embodiment, second indicator 206B is configured so that the second distance 182 is greater than the first distance 180. That is, indicator 206B is configured to project farther away from external housing 208 in the released configuration than indicator 206A. This allows a user to easily visually determine that both indicators 206A and 206B have been released, indicating that the temperature inside the piece of electrical equipment has exceeded the high temperature threshold. Alternatively, if only the low temperature threshold has been exceeded, only indicator 206A will be visible. In the illustrated embodiment, the positioning of projection 239A/239B on indicators 206A/206B is used to vary the distance by which the respective indicator projects, that is, projection 239A is positioned farther from the proximal end of indicator 206A than projection 239B is positioned relative to the proximal end of indicator 206B, so that indicator 206A will extend farther in the released configuration than will indicator 206B when projection 239A is in contact with its corresponding hard stop and when projection 239B is in contact with its corresponding hard stop.

In some embodiments, the orientation in which external housing 208 is installed in a piece of electrical equipment should be selected to ensure that a user will be able to determine upon a visual inspection whether only indicator 206A or both indicators 206A and 206B have been released. For example, if external housing 208 is installed so that a plane extending between indicators 206A and 206B extends vertically relative to the ground, a user will be able to see both indicators 206A and 206B at the same time. In contrast, if external housing 208 is installed so that a plane extending between indicators 206A and 206B extends horizontally relative to the ground, a user will be able to easily see only one of indicators 206A and 206B, and extension of indicator 206B may obscure indicator 206A, so that a user may be uncertain if one or both indicators have been released.

In some embodiments, the orientation in which external housing 208 is installed can be regulated by the shape of external housing 208; for example, external housing 208 may be provided with one flat edge, which can engage with a corresponding flat edge provided in the aperture through which external housing 208 is installed in a piece of electrical equipment. In the illustrated embodiment, external housing 208 is provided with one or more gussets 209, which may be used to help align external housing 208 correctly during installation in a circular aperture. In some embodiments, gussets 209 may also serve as a fill level gauge.

In alternative embodiments, other ways of differentiating indicators 206A and 206B can be used so that a user will be able to determine whether only indicator 206A has been released or whether both indicators 206A, 206B have been released. For example, first indicator 206A can have a brightly coloured outer surface 240A of a first colour, e.g. yellow, and second indicator 206B can have a brightly coloured surface 240B of a second colour, e.g. red. In alternative embodiments, different visual indicators than colour may be used to differentiate indicators 206A, 206B. For example, in addition to or as an alternative to being provided with a different colour, the two components may be provided with a different shape (e.g. square for one and circular for the other), different textures (e.g. smooth versus rough) and/or different patterns (e.g. stripes having different thicknesses or orientations), different temperature ratings or other printed indicia on the distal ends of indicators 206A, 206B (for example, the predetermined temperature at which each indicator is activated, or the wording "LOW" and "HIGH", or the like) so that a user can readily determine by visual inspection whether no indicator has been released, only first indicator 206A has been released, or both indicators 206A, 206B have been released.

In alternative embodiments, each of indicators 206A, 206B can be configured to break or connect separate electrical circuits when indicators 206A, 206B, respectively, are released, which will allow the generation of two separate electrical signals, a first when indicator 206A is released and a second when indicator 206B is released.

Figure 13:
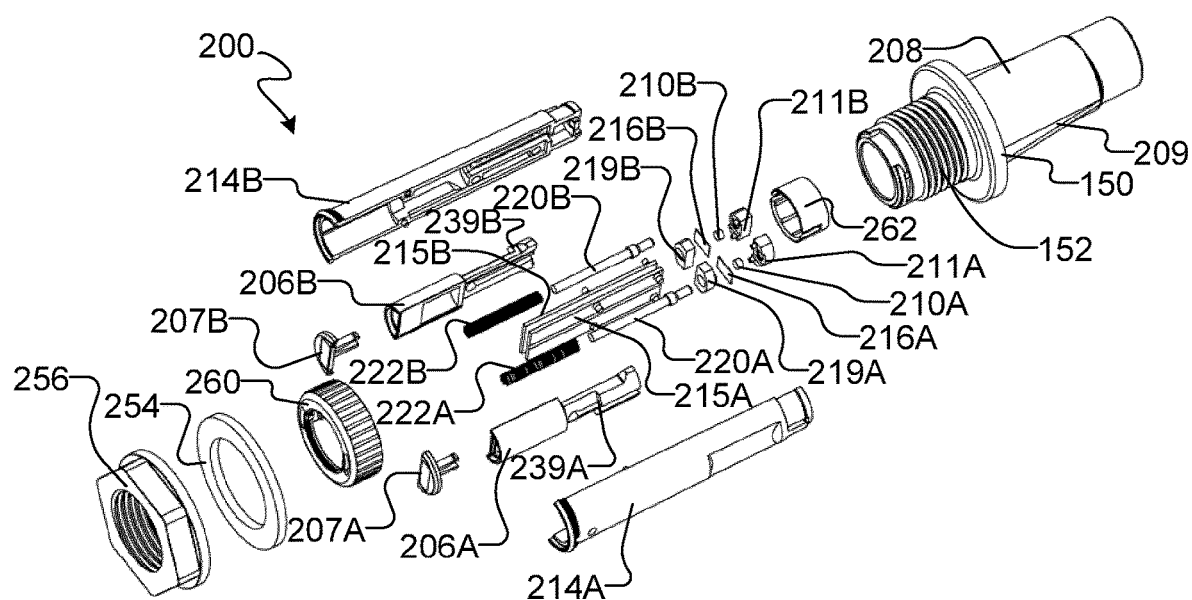
FIG. 13 is an exploded view of the temperature sensor and indicator shown in FIG. 9.

In the illustrated embodiment of FIG. 13, each one of indicators 206A, 206B is provided with an end cap 207A, 207B. In some embodiments, the first predetermined temperature threshold can be printed on end cap 207A and the second predetermined temperature threshold can be printed on end cap 207B. This allows a user to read the relevant temperature thresholds to confirm the temperature or temperatures which have been exceeded.

Figure 14:
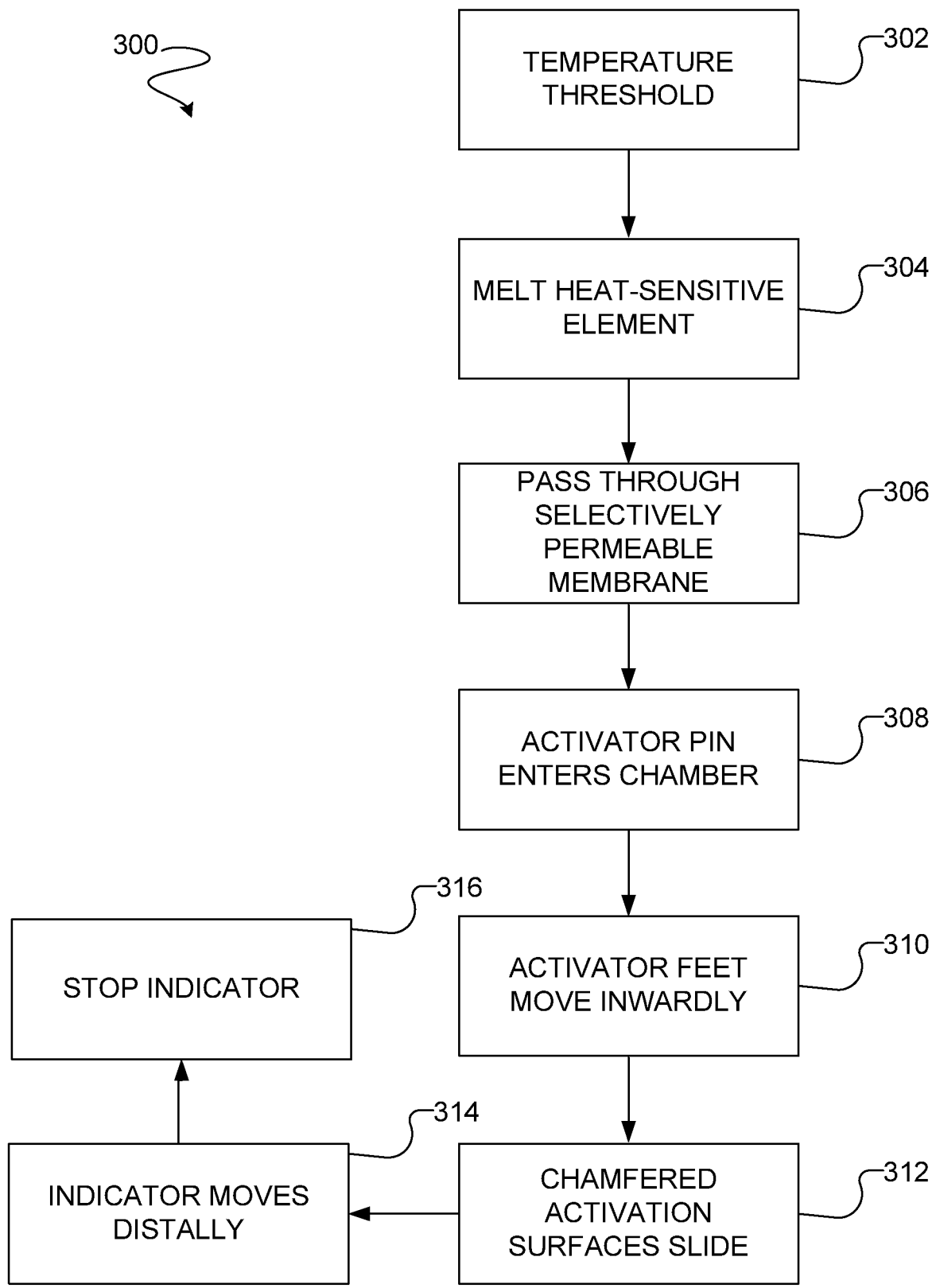
FIG. 14 is an example embodiment of a method of sensing and indicating that the temperature has passed a predetermined temperature threshold.

With reference to FIG. 14, an example embodiment of a method 300 of using a temperature sensor and indicator to sense and indicate an increase in temperature above a predetermined threshold is illustrated. At step 302, the temperature reaches or exceeds the predetermined threshold. At step 304, a heat-sensitive element contained within a chamber melts, thereby changing from a solid to a liquid. At step 306, the heat-sensitive element in its liquid state passes through a selectively permeable membrane that is impermeable to the heat-sensitive element in its solid state but permeable to the heat-sensitive element in its liquid state. At step 308, an activator pin that is biased against the membrane and the heat-sensitive element and that is initially retained in position by the heat-sensitive element in its solid state is permitted to move into the chamber as the heat-sensitive element in its liquid phase flows through the selectively permeable membrane, to thereby place the temperature sensor in its activated configuration.

In embodiments in which the temperature sensor is operatively engaged with an indicator, the method 300 further includes providing an indication that the temperature has increased above the predetermined threshold. In such embodiments, at step 310, movement of the activator pin into the chamber displaces the activator pin from an initial configuration in which the activator pin interposes a plurality of activator feet of an indicator release mechanism. This allows the activator feet to be compressed inwardly together. At step 312, the inward movement of the activator feet allows chamfered activation surfaces of the activator feet to slide axially in the distal direction relative to correspondingly chamfered retaining surfaces provided on an inner surface of a shell of the temperature sensor and indicator. At step 314, longitudinal movement of the indicator release mechanism releases an indicator in the distal direction. In some embodiments, at step 316, a hard stop on the inner surface of a sliding channel within which the indicator moves becomes engaged with a corresponding projection formed on the outer surface of the indicator, to prevent full ejection of the indicator. In alternative embodiments, step 316 is omitted.

Figure 15:
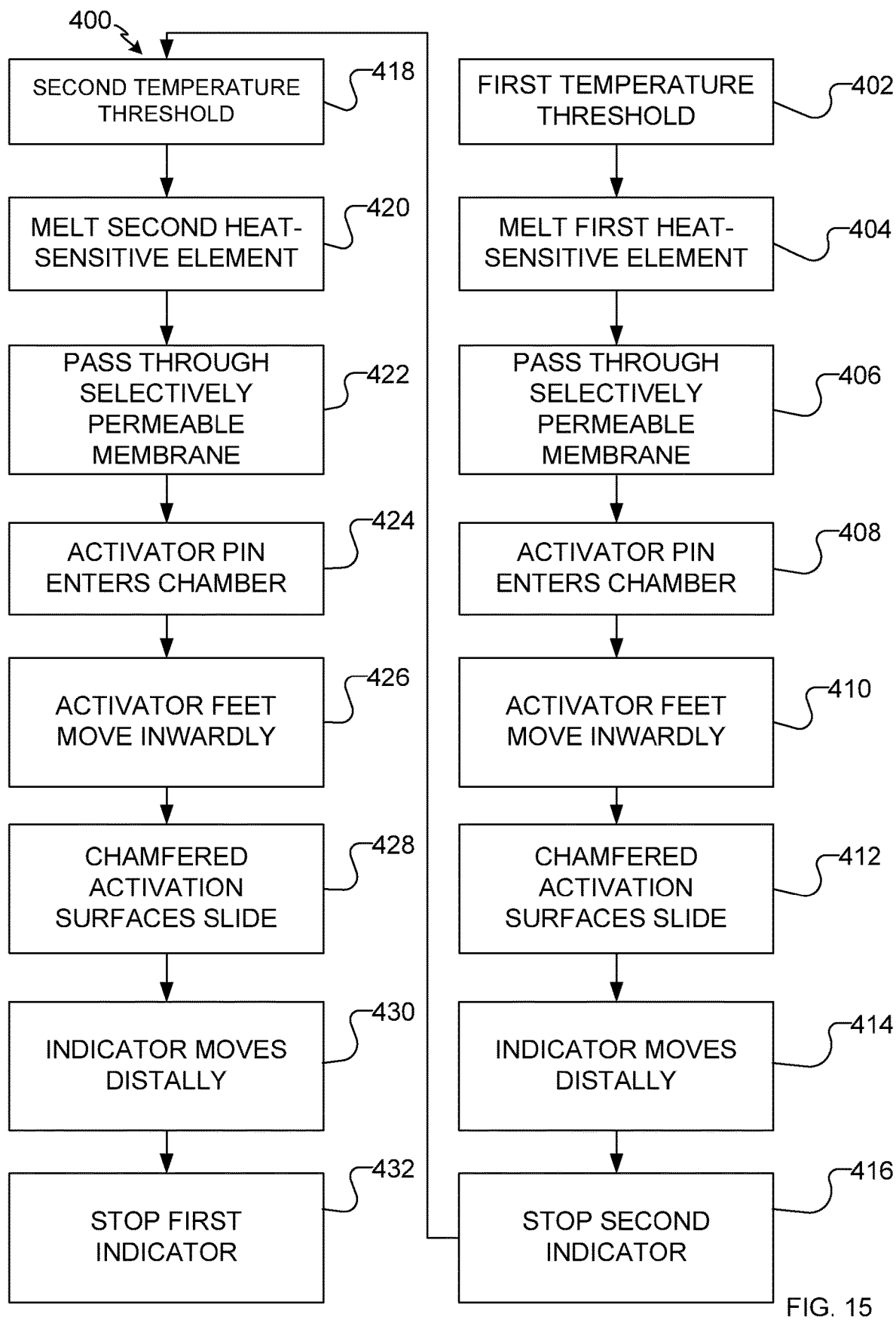
FIG. 15 is an example embodiment of a method of sensing and indicating that the temperature has passed one or both of two distinct predetermined temperature thresholds.

With reference to FIG. 15, an example embodiment of a method 400 of using a temperature sensor and indicator having two distinct temperature sensing and indicating units to sense and indicate an increase in temperature above one or both of two distinct predetermined temperature thresholds is illustrated. The first predetermined temperature threshold is a lower temperature than the second predetermined temperature threshold.

At step 402, the temperature reaches or exceeds the first predetermined temperature threshold. At step 404, the heat-sensitive element contained within a chamber of the first temperature sensing and indicating unit melts, thereby changing from a solid to a liquid. At step 406, the heat-sensitive element in the first temperature sensing and indicating unit in its liquid state passes through a selectively permeable membrane that is impermeable to the heat-sensitive element in its solid state but permeable to the heat-sensitive element in its liquid state. At step 408, an activator pin that is biased against the membrane and the heat-sensitive element and that is initially retained in position by the heat-sensitive element in its solid state is permitted to move into the chamber as the heat-sensitive element in its liquid phase flows through the selectively permeable membrane in the first temperature sensing and indicating unit, to thereby place the first temperature sensor in its activated configuration.

At step 410, movement of the activator pin into the chamber displaces the activator pin from an initial configuration in which the activator pin interposes a plurality of activator feet of an indicator release mechanism of the first temperature sensing and indicating unit. This allows the activator feet to be compressed inwardly together. At step 412, the inward movement of the activator feet allows chamfered activation surfaces of the activator feet to slide axially in the distal direction relative to correspondingly chamfered retaining surfaces provided on an inner surface of the first temperature sensing and indicating unit. At step 414, longitudinal movement of the indicator release mechanism releases an indicator of the first temperature sensing and indicating unit in the distal direction. In some embodiments, at step 416, the indicator of the first temperature sensing and indicating unit is stopped in the fully extended position of the indicator by engagement of a hard stop on the inner surface of a sliding channel within which the first indicator moves becomes engaged with a corresponding projection formed on the outer surface of the first indicator, to prevent full ejection of the first indicator. In some embodiments, step 416 is omitted.

At step 418, which may be at the same time as step 402 or at a different time, the temperature reaches or exceeds the second predetermined temperature threshold. At step 420, the heat-sensitive element contained within a chamber of the second temperature sensing and indicating unit melts, thereby changing from a solid to a liquid. At step 422, the heat-sensitive element in the second temperature sensing and indicating unit in its liquid state passes through a selectively permeable membrane that is impermeable to the heat-sensitive element in its solid state but permeable to the heat-sensitive element in its liquid state. At step 424, an activator pin that is biased against the membrane and the heat-sensitive element and that is initially retained in position by the heat-sensitive element in its solid state is permitted to move into the chamber as the heat-sensitive element in its liquid phase flows through the selectively permeable membrane in the second temperature sensing and indicating unit, to thereby place the second temperature sensor in its activated configuration.

At step 426, movement of the activator pin into the chamber displaces the activator pin from an initial configuration in which the activator pin interposes a plurality of activator feet of an indicator release mechanism of the second temperature sensing and indicating unit. This allows the activator feet to be compressed inwardly together. At step 428, the inward movement of the activator feet allows chamfered activation surfaces of the activator feet to slide axially in the distal direction relative to correspondingly chamfered retaining surfaces provided on an inner surface of the second temperature sensing and indicating unit. At step 430, longitudinal movement of the indicator release mechanism releases an indicator of the second temperature sensing and indicating unit in the distal direction. In some embodiments, at step 432, a hard stop on the inner surface of a sliding channel within which the second indicator moves becomes engaged with a corresponding projection formed on the outer surface of the second indicator, to prevent full ejection of the second indicator. In some embodiments, step 432 is omitted.

Figures 16A, 16B, 16C:
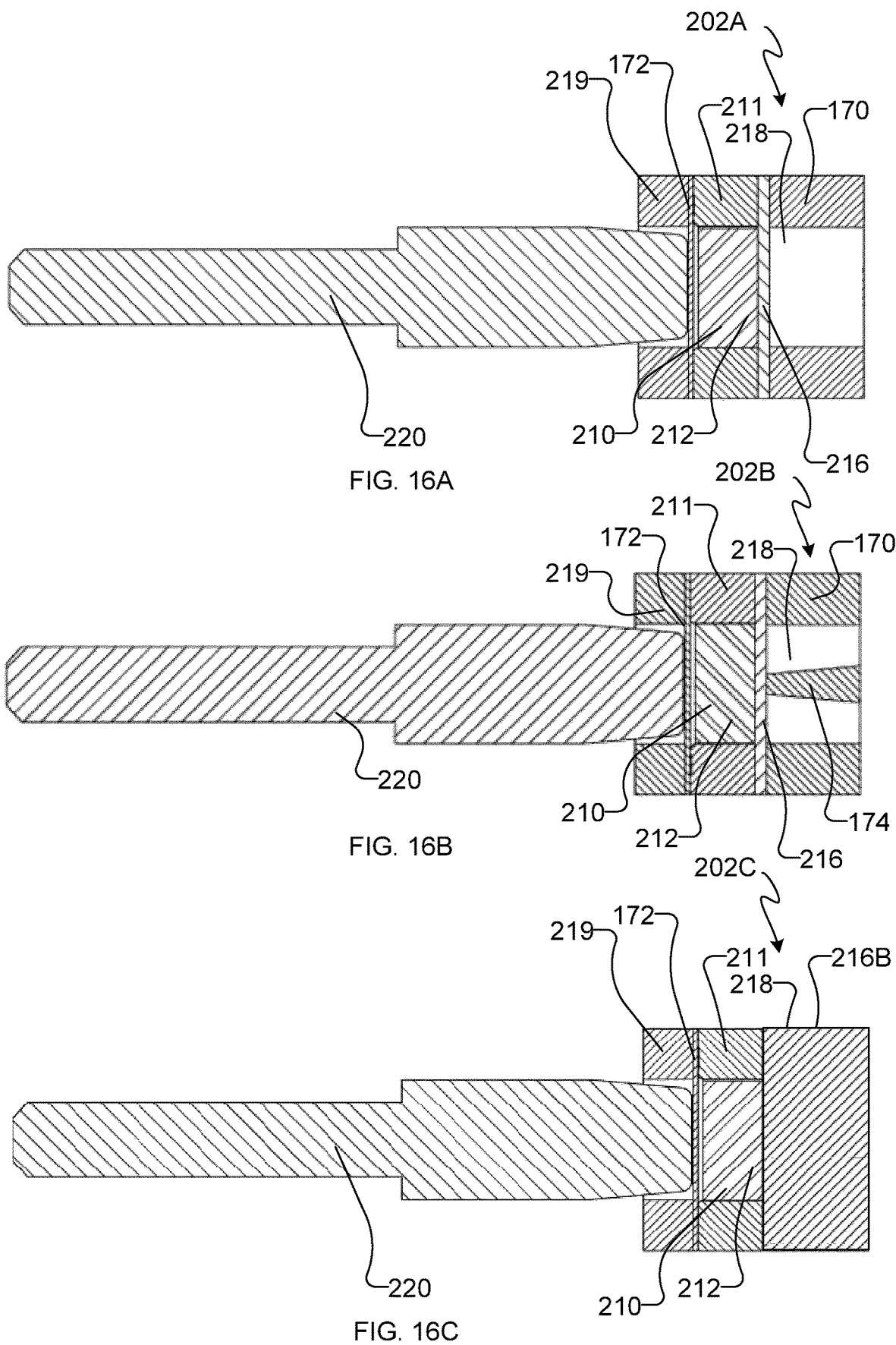
FIGS. 16A, 16B and 16C show embodiments of alternative configurations for a temperature sensor.

With reference to FIGS. 16A-16C, alternative embodiments of a thermally activated element 202A, 202B and 202C are illustrated. Elements of thermally activated element 202A, 202B and 202C that have a function similar to components of thermally activated element 102 are described with reference numerals incremented by 100.

With reference to FIG. 16A, thermally activated element 202A has a heat-sensitive element 210, which may be any of the materials described for heat-sensitive element 110. Heat sensitive-element 210 sits within first chamber 212, which is defined within an insert 211. First chamber 212 is sealed across at least a portion of its proximal end by a selectively permeable membrane 216 that is impermeable to the heat-sensitive element 210 when heat-sensitive element is in its solid state, but permeable to the heat-sensitive element 210 when the heat-sensitive element is in its liquid state. Any of the materials and properties described for selectively permeable membrane 116 could be used for selectively permeable membrane 216.

Second chamber 218 is defined proximally of selectively permeable membrane 216. Second chamber 218 can be defined in any suitable manner that allows second chamber 218 to receive heat-sensitive element 210 in its liquid state. In the illustrated embodiment, a surrounding support 170 is provided to secure selectively permeable membrane 216 in place to sealingly define first chamber 212, i.e. selectively permeable membrane 216 seals first chamber 212. Second chamber 218 is defined within the interior space of surrounding support 170.

The distal end of first chamber 212 is also sealed by a membrane 172. Membrane 172 can be a selectively permeable membrane, but in the illustrated embodiment, membrane 172 is an impermeable but flexible membrane. Suitable materials for membrane 172 include any of the materials used for selectively permeable membrane 116, but also impermeable flexible materials such as rubber or plastic, including non-porous rubber or plastic. In alternative embodiments, membrane 172 could be made from a material that ruptures due to the force applied by actuator pin 220 after heat-sensitive element 210 has started to pass through selectively permeable membrane 216. An actuator pin 220 is biased against membrane 172, and cannot enter first chamber 212 when heat-sensitive element is in the solid state.

Activation of thermally activated element 202A is similar to the activation of thermally activated element 102 previously described, except that when heat-sensitive element 210 melts, it passes in the proximal direction through selectively permeable membrane 216 into second chamber 218. Actuator pin 220 is biased against membrane 172, and because membrane 172 is flexible, actuator pin 220 is able to enter first chamber 212, thereby activating thermally activated element 202.

In some embodiments, as illustrated in FIG. 16B as an example embodiment 202B of a thermally activated element, a supplementary support 174 is provided to help retain heat-sensitive element 210 in its initial position when in the solid state. For example, in embodiments in which selectively permeable membrane 216 is flexible, a supplemental retaining element such as supplementary support 174 may be used to hold heat-sensitive element 210 in position when in the solid state. Heat-sensitive element 210 can still flow into second chamber 218 when in its liquid state despite the presence of supplementary support 174. Thermally activated element 202B is thus similar to thermally activated element 202A, except for the presence of supplementary support 174.

In alternative embodiments, rather than providing a supplementary support 174 to retain heat-sensitive element 210 in its initial position, selectively permeable membrane 216 may be made from a less flexible material, and/or may be made thicker, so that selectively permeable membrane 216 can support heat-sensitive element 210 in its initial position when heat-sensitive element 210 is in the solid state. In alternative embodiments, a combination of a supporting element and a thicker and/or less flexible selectively permeable membrane 216 is used to support heat-sensitive element 210 in its initial position when heat-sensitive element 210 is in the solid state.

With reference to FIG. 16C, a further alternative example embodiment of a thermally activated element 202C is illustrated. Thermally activated element 202C is generally similar to thermally activated element 202A, except that instead of selectively permeable membrane 216, a block of selectively permeable material 216B is provided proximally of heat-sensitive element 210 to receive heat-sensitive element 210 when in its liquid state. Selectively permeable material 216B is impermeable to heat-sensitive element 210 when heat-sensitive element 210 is in its solid state, and therefore holds heat-sensitive element 210 in position against the force applied by biasing pin 220 when heat-sensitive element 210 is in the solid state. When the predetermined temperature threshold is exceeded and heat-sensitive element 210 changes to its liquid state, then heat-sensitive element 210 can enter selectively permeable material 216B, allowing biasing pin 220 to enter first chamber 212. Examples of suitable material for selectively permeable material 216B include porous foams made of any material that is chemically compatible with heat-sensitive element 210.

In some embodiments, thermally activated element 202A, 202B or 202C is used in place of thermally activated element 102 in any of the embodiments described in this specification.

With reference to FIGS. 17A, 17B and 17C, an alternative embodiment of a thermally activated element 302 is illustrated schematically. Elements of thermally activated element 302 that perform a function similar to thermally activated element 102 are illustrated with reference numerals incremented by 200.

With reference to FIG. 17A, thermally activated element 302 has a base insert 311, a guide washer 319 defining a first chamber 312, and a shape memory material 310 that initially occupies first chamber 312. Shape memory material 310 is secured in any suitable manner so as to initially occupy first chamber 312. An actuator pin 320 that functions in generally the same manner as actuator pin 120 to allow inward movement of activator feet of an indicator after thermally activated element 302 is activated by an increase in temperature above a predetermined level is biased towards first chamber 312, but initially cannot enter first chamber 312 due to the presence of shape memory material 310.

Shape memory material 310 is selected to deform once a predetermined temperature threshold has been reached. The material from which shape memory material 310 is made can be selected so as to deform at the predetermined temperature threshold by one skilled in the art, so that the predetermined temperature threshold can be provided at any desired temperature.

Once the predetermined temperature threshold has been reached, shape memory material 310 deforms, as shown in FIG. 17B. This places thermally activated element 302 into the activated configuration, and allows the biasing force applied against actuator pin 320 to move the proximal end of actuator pin 320 into first chamber 312, as shown in FIG. 17C. The release of an indicator can thus occur in the same manner as described for temperature sensor and indicator 100.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A temperature sensor comprising:
a heat-sensitive element contained within a chamber, the heat-sensitive element having a melting temperature corresponding to a predetermined temperature;
a selectively permeable element defining at least a portion of the surface of the chamber, the selectively permeable element being permeable to the heat-sensitive element when the heat-sensitive element is in a liquid state and impermeable to the heat-sensitive element when the heat-sensitive element is in a solid state, the selectively permeable element being configured to contain the heat-sensitive element within the chamber when the heat-sensitive element is in the solid state and to receive the heat-sensitive element or allow the heat-sensitive element to exit the chamber when the heat-sensitive element is in the liquid state; and
a biased member biased toward the chamber to apply pressure against the heat-sensitive element, the biased member being initially prevented from moving toward the chamber by the heat-sensitive element when the heat-sensitive element is in the solid state and movable into the chamber to displace the heat-sensitive element when the heat-sensitive element is in the liquid state.

2. The temperature sensor as defined in claim 1, wherein the pressure applied by the biased member is sufficient to cause the heat-sensitive element to exit the chamber by passing through or being received by the selectively permeable element when the heat-sensitive element enters the liquid state.

3. The temperature sensor as defined in claim 1, wherein the selectively permeable element comprises sintered stainless steel, ceramic, a fine mesh, a porous membrane, or a porous foam.

4. The temperature sensor as defined in claim 3, wherein the fine mesh or the porous membrane comprises polytetrafluoroethylene.

5. A temperature sensor comprising:
a heat-sensitive element contained within a first chamber, the heat-sensitive element having a melting temperature corresponding to a predetermined temperature;
a selectively permeable membrane defining a first edge portion of the first chamber and being in sealing engagement therewith, the selectively permeable membrane being impermeable to the heat-sensitive element to contain the heat-sensitive element within the first chamber when the heat-sensitive element is in a solid state and permeable to the heat-sensitive element when the heat-sensitive element is in a liquid state to allow the heat-sensitive element to exit the first chamber; and
a biased member biased toward the first chamber to apply pressure on the heat-sensitive element, the biased member being initially prevented from entering the first chamber when the heat-sensitive element is in the solid state and movable toward the first chamber when the heat-sensitive element flows through the selectively permeable membrane.

6. The temperature sensor as defined in claim 5, wherein the selectively permeable membrane comprises a flexible membrane, wherein the flexible membrane is adapted to be deformed but not ruptured by the biased member when the biased member enters the first chamber.

7. The temperature sensor as defined in claim 5, wherein the heat-sensitive element comprises solder.

8. A piece of electrical equipment comprising the temperature sensor as defined in claim 5 operatively installed in a housing of the piece of electrical equipment.

9. The temperature sensor as defined in claim 5, wherein the biased member is biased against the selectively permeable membrane by a biasing element so that the selectively permeable membrane interposes the biased member and the heat-sensitive element.

10. The temperature sensor as defined in claim 9, wherein the biasing element comprises a coil spring, and wherein the biased member comprises a contact surface that contacts a proximal end of the coil spring so that the coil spring exerts a biasing force against the biased member in the direction of the first chamber.

11. The temperature sensor as defined in claim 5, wherein a solder washer is provided to retain the selectively permeable membrane in position, the solder washer comprising an axially extending channel therethrough, the proximal end of the biased member extending though the axially extending channel of the solder washer.

12. The temperature sensor as defined in claim 11, wherein the axially extending channel of the solder washer comprises a tapered surface, the tapered surface extending radially inwardly from a distal end of the axially extending channel of the solder washer to a proximal end of the axially extending channel of the solder washer.

13. The temperature sensor as defined in claim 12, wherein the axially extending channel of the solder washer defines, at least in part, a second chamber for receiving the heat-sensitive element after the heat-sensitive element has melted.

14. The temperature sensor as defined in claim 5, wherein the biased member is biased by the biasing element against a second membrane provided along a second edge portion of the first chamber.

15. The temperature sensor as defined in claim 14, wherein the second membrane comprises a selectively permeable membrane.

16. The temperature sensor as defined in claim 14, wherein the second membrane comprises a flexible membrane.

17. The temperature sensor and an indicator comprising: the temperature sensor as defined in claim 5; and the indicator
having an indicator release mechanism operatively engaged with the biased member, the indicator release mechanism being releasable upon movement of the biased member into the chamber.

18. The temperature sensor and indicator as defined in claim 17, wherein the indicator is configured to connect or disconnect an electrical circuit when the indicator is moved to the released position, to provide an indication that the temperature sensor has been activated.

19. The temperature sensor as defined in claim 5, wherein the biased member comprises a pin, and a proximal end of the pin comprises one or more fluid flow channels.

20. A method of sensing an increase in temperature above a predetermined temperature threshold, the method comprising the steps of:
providing a heat-sensitive element within a chamber, the heat-sensitive element being selected to have a melting temperature corresponding to the predetermined temperature threshold;
biasing a biased member towards the chamber to apply pressure on the heat-sensitive element;
allowing the temperature to rise above the predetermined temperature threshold to melt the heat-sensitive element; and
allowing the heat-sensitive element to enter a selectively permeable material, the selectively permeable material being selected to be impermeable to the heat-sensitive element to contain the heat-sensitive element within the chamber when the heat-sensitive element is in the solid state and permeable to the heat-sensitive element when the heat-sensitive element is in the liquid state to allow the heat-sensitive element to exit the chamber so that the biased member can move toward the chamber to displace the heat-sensitive element.

21. A method of sensing an increase in temperature above a predetermined threshold, the method comprising the steps of:
retaining a solid heat-sensitive element in an initial position within a chamber with a selectively permeable membrane, the selectively permeable membrane being impermeable to the heat-sensitive element when the heat-sensitive element is in a solid state but permeable to the heat-sensitive element when the heat-sensitive element is in a liquid state, and the heat-sensitive element being selected to have a melting temperature corresponding to the predetermined temperature threshold;
biasing a biased member to apply pressure to the heat-sensitive element;
allowing the temperature to rise above the predetermined threshold to melt the heat-sensitive element;
allowing the heat-sensitive element to flow through the selectively permeable membrane and out of the chamber; and
allowing the biased member to move towards the chamber as a result of the applied biasing force.

22. The method as defined in claim 21, wherein the step of biasing the biased member to apply pressure to the heat-sensitive element comprises biasing the biased member against the selectively permeable membrane so that the selectively permeable membrane interposes the biased member and the heat-sensitive element.

23. The method as defined in claim 21, further comprising releasing an indicator operatively engaged with the biased member from an initial locked configuration to a released configuration when the biased member moves towards the chamber.

24. The method as defined in claim 23, wherein the released configuration is visually different from the initial locked configuration so that a user can visually determine that the indicator has moved from the initial locked configuration to the released configuration.

25. The method as defined in claim 23, wherein the step of allowing the indicator to move from an initial locked configuration to a released configuration comprises connecting or disconnecting an electrical circuit to provide an indication that the temperature sensor has been activated.

* * * * *